US009470951B2

United States Patent
Liboiron-Ladouceur et al.

(10) Patent No.: US 9,470,951 B2
(45) Date of Patent: Oct. 18, 2016

(54) METHODS AND DEVICES FOR PHOTONIC M-ARY PULSE AMPLITUDE MODULATION

(71) Applicants: Odile Liboiron-Ladouceur, Montreal (CA); Mohammad Shafiqul Hai, Montreal (CA); Monireh Moayedi Pour Fard, Montreal (CA)

(72) Inventors: Odile Liboiron-Ladouceur, Montreal (CA); Mohammad Shafiqul Hai, Montreal (CA); Monireh Moayedi Pour Fard, Montreal (CA)

(73) Assignee: The Royal Institution for the Advancement of Learning / McGill University, Montreal (CA)

( * ) Notice: Subject to any disclaimer, the term of this patent is extended or adjusted under 35 U.S.C. 154(b) by 0 days.

(21) Appl. No.: 14/879,361

(22) Filed: Oct. 9, 2015

(65) Prior Publication Data

US 2016/0103382 A1    Apr. 14, 2016

Related U.S. Application Data

(60) Provisional application No. 62/061,735, filed on Oct. 9, 2014.

(51) Int. Cl.
  *G02F 1/035* (2006.01)
  *G02F 1/225* (2006.01)
  *H04B 10/516* (2013.01)
  *G02F 1/21* (2006.01)

(52) U.S. Cl.
  CPC ............. *G02F 1/225* (2013.01); *H04B 10/516* (2013.01); *G02F 2001/212* (2013.01)

(58) Field of Classification Search
  None
  See application file for complete search history.

(56) References Cited

U.S. PATENT DOCUMENTS

| | | | |
|---|---|---|---|
| 2010/0158429 A1* | 6/2010 | Popovic | G02B 6/12002 385/3 |
| 2015/0016767 A1* | 1/2015 | Akiyama | H01S 5/142 385/3 |

OTHER PUBLICATIONS

Baba et al., "50-Gb/s Ring Resonator-Based Silicon Modulator", Optics Express, May 2013, pp. 11869-11876, vol. 20, No. 10, Optical Society of America.

Green et al., "Hybrid InGaAsP—InP Mach-Zehnder Racetrack Resonator for Thermooptic Switching and Coupling Control", Optics Express, 2005, pp. 1651-1659, vol. 13, No. 5, Optical Society of America.

(Continued)

*Primary Examiner* — Hemang Sanghavi
(74) *Attorney, Agent, or Firm* — The Law Office of Michael E. Kondoudis

(57) ABSTRACT

CMOS compatible SOI photonic integrated circuits (PICs) offer a low cost and promising solution to future short reach optical links operating beyond 100 Gb/s. A key building block in these optical links is the external optical modulator. Amongst, the PIC geometries for external modulators are those based upon ring resonators and Mach-Zehnder interferometers (MZI) where while the latter have been reported with increased thermal stability and fabrication tolerances, the former have demonstrated lower loss and lower driving voltages leading to a more energy efficient approach. Multi-segmented electrode structure based PAM optical modulator can potentially replace the analog digital-to-analog circuits (DACs) which are commonly used to achieve the multilevel electrical driving signal. Accordingly, it would be beneficial to combine the benefits of ring resonators to provide PAM-N modulators. It would be further beneficial for such PAM-N ring resonator modulators to exploit multi-segmented electrode structures to remove the requirements for high speed DACs.

7 Claims, 22 Drawing Sheets

(56) References Cited

OTHER PUBLICATIONS

Rosenberg et al., "A 25 Gbps Silicon Microring Modulator based on an Interleaved Junction", Optics Express, Nov. 2012, pp. 26411-26423, vol. 20, No. 24, Optical Society of America.

Sacher et al., "Coupling Modulation of Microrings at Rates Beyond the Linewidth Limit", Optics Express, Apr. 2013, pp. 9722-9733, vol. 21, No. 8, Optical Society of America.

Wu et al., "A 20Gb/s NRZ/PAM-4 1V Transmiter in 40nm CMOS Driving a Si-Photonic Modulator in 0.13um CMOS", Proceedings of the IEEE International Solid State Circuits Conference, Feb. 2013, pp. 128-129, Institute of Electrical and Electronics Engineers.

Xu et al., "Micrometre-Scale Silicon Electro-Optic Modulator", Nature, May 2005, pp. 325-327, vol. 435, Nature Publishing Group.

Xu et al., "12.5 Gbit/s Carrier-Injection-Based Silicon Micro-Ring Silicon Modulators", Optics Express, 2007, pp. 430-436, vol. 15, No. 2, Optical Society of America.

Yariv et al., "Critical Coupling and Its Control in Optical Waveguide-Ring Resonator Systems", IEEE Photonics Technology Letters, Apr. 2002, pp. 483-485, vol. 14, No. 4, Institute of Electrical and Electronics Engineers.

\* cited by examiner

1700

1750

1800

1850

METHODS AND DEVICES FOR PHOTONIC M-ARY PULSE AMPLITUDE MODULATION

CROSS-REFERENCE TO RELATED APPLICATIONS

This patent application also claims the benefit of U.S. Provisional Patent Applications 62/061,735 filed Oct. 9, 2015 entitled "Methods and Devices for Photonic M-ary Pulse Amplitude Modulation", the entire contents of which are incorporated herein by reference.

FIELD OF THE INVENTION

This invention relates to photonic integrated circuit external modulators and more particularly to pulse amplitude modulators exploiting ring resonator elements.

BACKGROUND OF THE INVENTION

Today the Internet comprises over 100 billion plus web pages on over 100 million websites being accessed by nearly 3 billion users conducting approximately 3 billion Google searches per day, sending approximately 150 billion emails per day. With these statistics it is easy to understand but hard to comprehend how much data is being uploaded and downloaded every second on the Internet even before considering the current high growth rate of high bandwidth video. By 2016 this user traffic is expected to exceed 100 exabytes per month, over 100,000,000 terabytes per month, or over 42,000 gigabytes per second. However, peak demand will be considerably higher with projections of over 600 million users streaming Internet high-definition video simultaneously at peak times.

All of this data will flow to and from users via data centers and across telecommunication networks from ultra-long-haul networks down through long-haul networks, metropolitan networks and passive optical networks to users through Internet service providers and then Enterprise/small office—home office (SOHO)/Residential access networks. In the long-haul national and regional backbone networks and metropolitan core networks dense wavelength division multiplexing (DWDM) with channel counts of 40 or 100 wavelengths supporting 10 Gb/s and 40 Gb/s datarates per channel have been deployed over the past decade and are now being augmented with next generation 40 Gb/s and 100 Gb/s coherent technologies for ultra-long-haul, long-haul and metropolitan networks exploiting, for example, polarization multiplexed quadrature phase shift key (PM-QPSK) modulation and soft decision forward error correction (SD-FEC) technology.

In the local area network, within data centers and Ethernet networks generally current and upcoming standards for 100 Gb/s such as 100GBASE-SR10, 100GBASE-SR4, and 100GBASE-LR4 are based upon using 10 lanes of 10 Gb/s or 4 lanes of 25 Gb/s. Traditionally, the strategy for capacity upgrades has been to exploit the benefits of parallel optics and to rely on higher bandwidth availability for the electronic and optical components. However, this approach would require 16 lanes at 25 Gbit/s in order to achieve a 400 Gb/s, thereby making it challenging to meet projected 400 Gbit/s form-factor pluggable, e.g. CDFP2 and CDFP4, requirements on power consumption and footprint. Therefore, it is crucial to develop other solutions for beyond 100 Gbit/s data links satisfying these industry requirements in terms of footprint, power consumption and cost efficiency.

However, already 200 gigabit Ethernet (GbE), 400 GbE, and 1 terabit Ethernet (TbE) are planned using, for example 16×25 Gb/s, 8×50 Gb/s, or 4×100 Gb/s to achieve 400 GbE over singlemode fiber (SMF) for connecting Internet Protocol (IP) core routers and the optical transmission network (OTN) together or connecting IP routers for example. 8×50 Gb/s, or 4×100 Gb/s would be anticipated to be compatible with 400 GbE form-factor pluggable transceivers. At this point in time whilst standards committees such as IEEE 802.3 400 GbE Study Group are developing specifications at multiple link lengths to address these different applications such as 2 km, 10 km, and 40 km there is an overall industry debate as to the modulation format or formats to be employed in the electrical interfaces such as non-return to zero (NRZ), 4-ary pulse amplitude modulation (PAM-4 or PAM4) or other advanced modulation formats. PAM-4 is one example of multilevel amplitude modulation, commonly referred to as M-ary pulse amplitude modulation (PAM-M), along with PAM8 and others.

Today 8×50 Gb/s PAM-4 and 4×100 Gb/s PAM-4 are considered promising candidates to satisfy the 10 km and 2 km SMF objectives respectively in 400 GbE. Discrete multitone modulation (DMT) in conjunction with multi-band carrierless amplitude phase modulation (MCAP) has been proposed for longer distance 40 km SMF links.

Accordingly, in order to exploit optical PAM-4 transmitters it is necessary to establish low cost, small footprint, low power PAM-4 external optical modulators (external modulators) for use in conjunction with optical emitters, such as wavelength stabilised continuous wave (CW) distributed feedback (DFB) laser diodes. Such external optical modulators will exploit photonic integrated circuit (PIC) technologies. Amongst the material technologies for PICs are indium phosphide (the same material system as the DFB laser diodes), lithium niobate, and silicon-on-insulator (SOI). Whilst indium phosphide supports integration of the PAM-4 external modulators it does not support the integration of control and drive electronics. Lithium niobate does not support integration of either the DFB or electronics. However, SOI PICs support monolithic integration of the PIC with the control and drive electronics and hybrid integration of semiconductor DFBs and photodiodes, see for example Kapulainen et al. in "Hybrid Integration of InP Laser with SOI Waveguides using Thermocompression Bonding" (IEEE Conf. Group IV Photonics, pp. 61-63) or semiconductor optical amplifiers, SOI distributed Bragg reflectors, photodetectors and WDM multiplexers/demultiplexer, see for example Alduino et al. in "Demonstration of a High Speed 4-Channel Integrated Silicon Photonics WDM Link with Hybrid Silicon Lasers" (Integrated Photonics Research—Silicon and Nanophotonics, 2010).

As such CMOS compatible SOI photonic integrated circuits (PICs) offer a low cost and promising solution to build future short reach optical links operating beyond 100 Gb/s. A key building block in these optical links is the external optical modulator, which acts as the electro-optic converter encoding the electrical drive derived from the digital data onto the CW optical signal. Amongst, the PIC geometries for external modulators are those based upon ring resonators and Mach-Zehnder interferometers (MZI). Whilst MZI modulators have been reported with increased thermal stability and fabrication tolerances compared to ring resonator modulators, the latter have demonstrated lower loss and good modulation efficiencies at lower peak to peak driving voltages leading to a more energy efficient approach.

Recently, a PAM-4 MZI employing 0.13 μm CMOS technology was reported by Wu et al. operating at data rates over 20 Gb/s, see "A 20 Gb/s NRZ/PAM-4 1V Transmitter in 40 nm CMOS Driving a Si-Photonic Modulator in 0.13 μm CMOS" (2013 IEEE Int. Solid State Circuits Conference, pp. 128-129). The multi-segmented electrode structure based PAM optical modulator can potentially replace the analog digital-to-analog circuits (DACs) which are commonly used to achieve the multilevel electrical driving signal. Accordingly, it would be beneficial to combine the benefits of ring resonators to provide PAM-N modulators. It would be further beneficial for such PAM-N ring resonator modulators to exploit multi-segmented electrode structures to remove the requirements for high speed DACs.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to address limitations within the prior art relating to photonic integrated circuit external modulators and more particularly to pulse amplitude modulators exploiting ring resonator elements.

In accordance with an embodiment of the invention there is provided a device comprising:
a substrate;
an optical circuit formed upon the substrate comprising:
  an input waveguide coupled to an input port of a first coupler comprising two inputs and two outputs;
  an output waveguide coupled to an output port of a second coupler comprising two inputs and two outputs;
  a Mach-Zehnder interferometer comprising the first coupler, a second coupler and first and second interferometer arms coupling the outputs from the first coupler to the inputs of the second coupler; and
  a ring waveguide coupling the other output of the second coupler to the other input of the first coupler and therein coupled to one of the first and second interferometer arms; and
an electrical circuit formed upon the substrate comprising:
  in a first configuration a bias electrode disposed in predetermined relationship to the other of the first and second interferometer arms not coupled to the ring waveguide and at least two pairs of drive electrodes of a plurality of drive electrodes, each pair of drive electrodes of the plurality of electrodes being disposed to induce phase shifts in the first and second interferometer arms;
  in a second configuration a bias electrode disposed in predetermined relationship to the other of the first and second interferometer arms not coupled to the ring waveguide and at least two drive electrodes of a plurality of drive electrodes, each drive electrode of the plurality of electrodes to induce a phase shift in the ring waveguide;
  in a third configuration a bias electrode disposed in predetermined relationship to the other of the first and second interferometer arms not coupled to the ring waveguide and at least two drive electrodes of a plurality of drive electrodes, each drive electrode of the plurality of electrodes to induce a phase shift in the one of the first and second interferometer arms; and
  in a fourth configuration a first bias electrode disposed in predetermined relationship to the other of the first and second interferometer arms not coupled to the ring waveguide, a second bias electrode disposed within the ring waveguide in the portion external to the Mach-Zehnder interferometer, and at least two pairs of drive electrodes of a plurality of pairs of drive electrodes, each pair of drive electrodes comprising a first electrode in the first interferometer arm and a second electrode in the second interferometer arm such that the pair of electrodes induce opposite phase shifts within the first and second interferometer arms In accordance with an embodiment of the invention there is provided a device comprising:

In accordance with an embodiment of the invention there is provided a method of generating an N-ary pulse amplitude modulated optical signal comprising modulating an optical source with a N-ary pulse amplitude modulator (PAM-N) wherein the PAM-N applies X electrical drive signals to the PAM-N on the ring waveguide portion of a ring waveguide interferometer and $2^X = N$.

In accordance with an embodiment of the invention there is provided a method of generating an N-ary pulse amplitude modulated optical signal comprising modulating an optical source with a N-ary pulse amplitude modulator (PAM-N) wherein the PAM-N applies X electrical drive signals to each arm of the interferometer of a ring waveguide interferometer and $2^X = N$.

In accordance with an embodiment of the invention there is provided a method of generating an N-ary pulse amplitude modulated optical signal comprising:
providing a N-ary modulator coupled to an optical source, the N-ary modulator exploiting a ring resonator Mach-Zehnder interferometer and comprising an optical layer and an electrical layer, wherein the optical layer comprises:
  a Mach-Zehnder interferometer comprising a first coupler, a second coupler and first and second interferometer arms coupling the outputs from the first coupler to the inputs of the second coupler; and
  a ring waveguide coupling the other output of the second coupler to the other input of the first coupler and therein coupled to one of the first and second interferometer arms; and
providing X electrical drive signals to the electrical layer of the N-ary modulator where $N=2^X$ and the electrical layer comprises:
  in a first configuration a bias electrode disposed in predetermined relationship to the other of the first and second interferometer arms not coupled to the ring waveguide and at least two pairs of drive electrodes of a plurality of drive electrodes, each pair of drive electrodes of the plurality of electrodes being disposed to induce phase shifts in the first and second interferometer arms;
  in a second configuration a bias electrode disposed in predetermined relationship to the other of the first and second interferometer arms not coupled to the ring waveguide and at least two drive electrodes of a plurality of drive electrodes, each drive electrode of the plurality of electrodes to induce a phase shift in the ring waveguide;
  in a third configuration a bias electrode disposed in predetermined relationship to the other of the first and second interferometer arms not coupled to the ring waveguide and at least two drive electrodes of a plurality of drive electrodes, each drive electrode of the plurality of electrodes to induce a phase shift in the one of the first and second interferometer arms; and
  in a fourth configuration a first bias electrode disposed in predetermined relationship to the other of the first and second interferometer arms not coupled to the ring waveguide, a second bias electrode disposed within the ring waveguide in the portion external to the Mach-Zehnder interferometer, and at least two pairs of drive electrodes of a plurality of pairs of drive electrodes, each pair of drive electrodes comprising a first electrode in the first interferometer arm and a second electrode in the second interferometer arm such that the pair of electrodes induce opposite phase shifts within the first and second interferometer arms.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
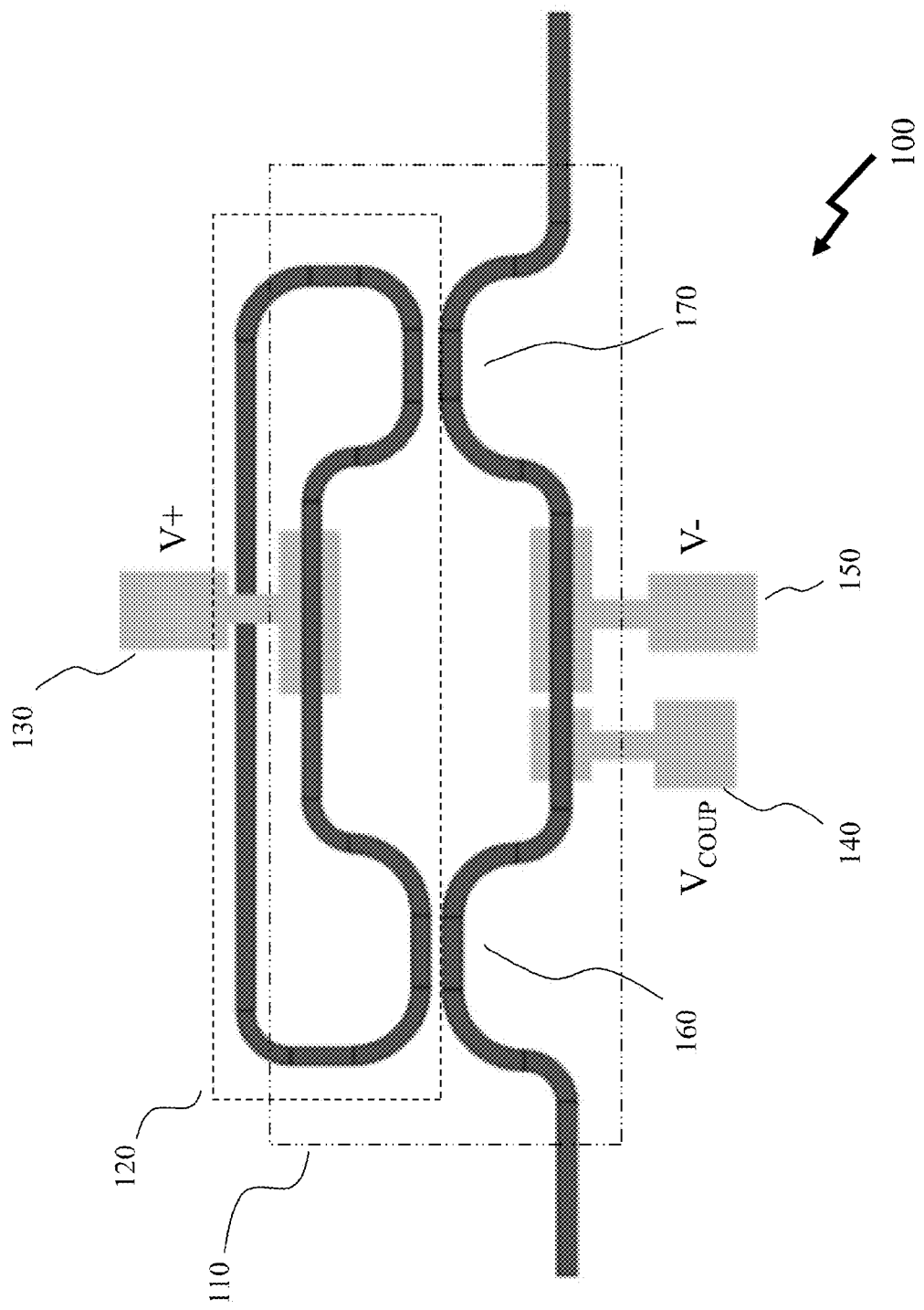
FIG. 1 depicts a ring resonator modulator according to the prior art.

The present invention is directed to photonic integrated circuit external modulators and more particularly to pulse amplitude modulators exploiting ring resonator elements.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

Ring Resonators and Ring Resonator Mach-Zehnder Interferometers

Conventionally, a ring resonator comprises a straight and a ring waveguide, typically circular disposed relatively spaced from each other such that the region of the ring waveguide closest to the straight waveguide behaves as a short directional coupler coupling light into and out of the ring structure. Optical signals coupled into the straight waveguide propagate through the directional coupler and at specific wavelengths a strong resonance occurs between the ring waveguide and the straight waveguide leading to a reduction of the transmission response of the straight waveguide at this resonant wavelength. In a simple ring resonator based modulator, not shown for clarity, employing silicon-on-insulator (SOI) waveguides then if an electrical diode is designed into the ring waveguide to change the effective index of the ring then the effective index of the ring changes due to the applied electrical signal causing the resonance wavelength to shift and hence the transmission of the straight waveguide to change. In this manner the electrical control signal within the ring waveguide can be used to generate binary on-off keying (OOK) optical signals. However, the extinction ratio of the simple ring resonator modulator strongly depends on the power coupling ratio between the ring waveguide to straight waveguide and the ring cavity loss. The former is highly sensitive to manufacturing tolerances.

If the single directional coupler is replaced by a pair of directional couplers and the ring waveguide now forms one arm of a Mach-Zehnder interferometer based variable coupler then the coupling ratio of the overall structure is now controlled by the phase difference between the two arms of the Mach-Zehnder interferometer in the ring resonator. Accordingly, this allows for an efficient means to control the amount of power coupled to the ring waveguide through a single bias electrode. Such a ring resonator Mach-Zehnder interferometer design was first demonstrated by Yariv in "Critical Coupling and its Control in Optical Waveguide-Ring Resonator Systems" (IEEE Phot. Tech. Lett., Vol. 14, no. 4, pp. 483-485)., April 2002. [5]. Accordingly, modulating the signal applied to the control diode yields on-off keying based amplitude modulation from the structure, whereas the control is placed within the Mach-Zehnder interferometer then it is referred to as coupling modulation.

This design was extended by Sacher et al. in "Coupling Modulation of Micro-Rings at Rates beyond the Linewidth Limit" (Opt. Express, Vol. 21, pp. 9722-9733) as depicted in FIG. 1. Here the Mach-Zehnder interferometer (MZI) 110 and ring resonator 120 are clearly evident sharing the two directional couplers 160 and 170 and one arm of the MZI. (2013). Sacher extended the control to a bias electrode 140 and push-pull modulator drive through first and second driver contacts 130 and 150 which receive +V and −V signals respectively thereby lowering the peak-peak driver voltage output and as reducing significantly the resonance wavelength shift during modulation. Wu et al. in "Micrometer-Scale Silicon Electro-Optic Modulator" (Nature, Vol. 435, pp. 325-317) reported a similar ring resonator MZI modulator in indium phosphide (InP). However, the resulting modulator is still a binary OOK modulator.

PAM-4 Ring Resonator Mach-Zehnder Interferometers—Design 1

Figure 2:
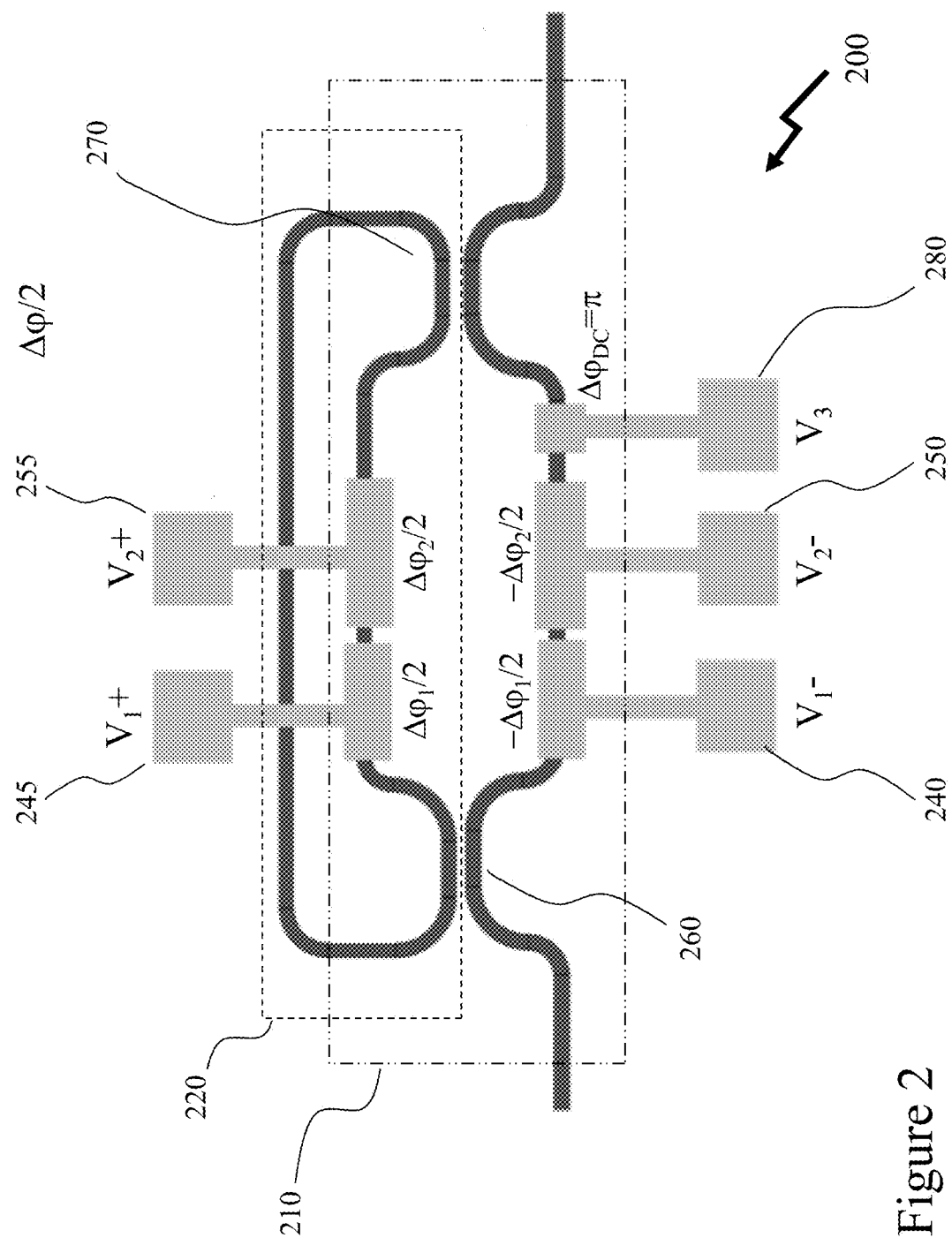
FIG. 2 depicts a ring resonator PAM-4 modulator according to an embodiments of the invention.

Referring to FIG. 2 there is depicted a PAM-4 ring resonator Mach-Zehnder interferometer (RR-MZI) 200 according to an embodiment of the invention. Here, again, the Mach-Zehnder interferometer (MZI) 210 and ring resonator 220 are clearly evident sharing the two directional couplers 260 and 270 and one arm of the MZI. Also depicted is the bias electrode 280 which in operation of the RR-MZI may be set to full transmission whilst the first and second pairs of electrodes (240/245) and (250/255) modify the net phase shift generating a modulated optical output signal in dependence upon the signals applied to the first and second pairs of electrodes (240/245) and (250/255). Accordingly, each of the first and second pairs of electrodes (240/245) and (250/255) acts a push-pull drive pair wherein the first pair of electrodes (240/245) with applied voltages <−$V_1$:+$V_1$> generate phase shifts <−$\Delta\phi_1$/2:+$\Delta\phi_1$/2>. The second pair of electrodes (250/255) with applied voltages <−$V_2$:+$V_2$> generate phase shifts <−$\Delta\phi_2$/2:+$\Delta\phi_2$/2>. Accordingly, based upon the generated phase shifts in the two sections then by appropriate selection of the two generated phase shifts then applying data simultaneously data for 2-bits to the RR-MZI 200 will yield 4 output levels dependent upon the logic state of each bit, and hence a PAM-4 modulation scheme is encoded as depicted in Table 1 below where the bias is set for full transmission at no applied drive signal.

TABLE 1

Logic Table for PAM-4 Modulator

| Bit 1 | Bit 2 | Transmission | RR-MZI State |
|---|---|---|---|
| 0 | 0 | 100% | 3 |
| 0 | 1 | 66% | 2 |
| 1 | 0 | 33% | 1 |
| 1 | 1 | 0% | 0 |

Analysis of the RR-MZI 200 yields required phase shifts as given by Table 2 to achieve these transmission states. Accordingly, it would be evident that setting $\Delta\phi_1=1.5\Delta\phi_2$ by making the lengths of the first pair of electrodes (240/245) 50% longer than the second pair of electrodes (250/255) yields the desired phase shifts for equal drive voltages to each of the first and second pair of electrodes (240/245) and (250/255) respectively.

TABLE 2

Phase Shift Requirements for RR-MZI PAM-4 Modulator

| $\Delta\phi$ | $\Delta\phi/2$ | Transmission | RR-MZI State |
|---|---|---|---|
| 0 | 0 | 100% | 3 |
| 8° | 4° | 66% | 2 |
| 12° | 6° | 33% | 1 |
| 20° | 10° | 0% | 0 |

TABLE 3

Drive Table for PAM-4 Modulator

| V First Electrode Pair | V Second Electrode Pair | Transmission | RR-MZI State |
|---|---|---|---|
| 0 | 0 | 100% | 3 |
| 0 | ±4° | 66% | 2 |
| ±6° | 0 | 33% | 1 |
| ±6° | ±4° | 0% | 0 |

Figure 3:
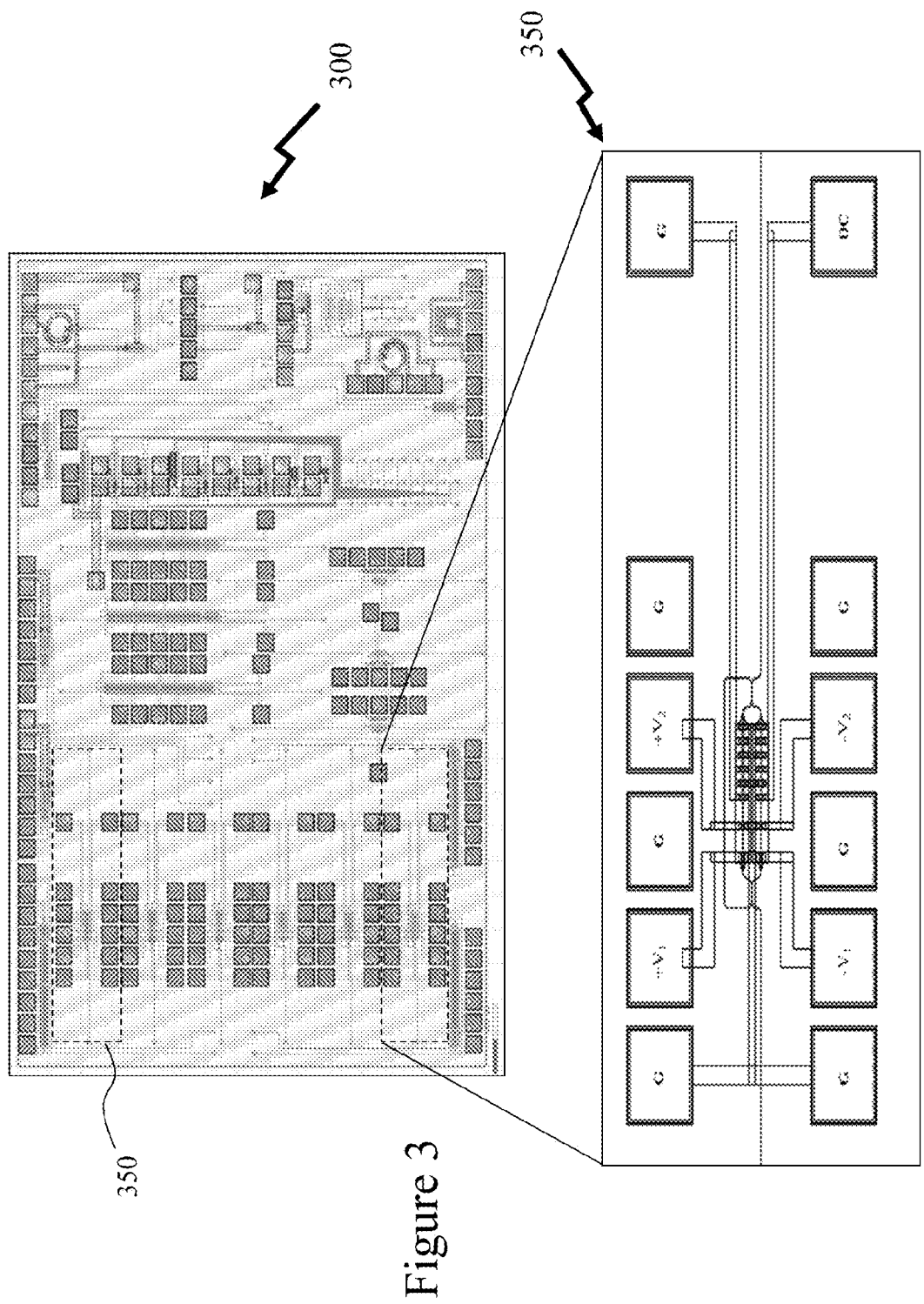
FIG. 3 depicts a mask schematic of a silicon-on-insulator (SOI) development test block and a SOI ring resonator PAM-4 modulator according to an embodiment of the invention as depicted in FIG. 2.
Figure 4:
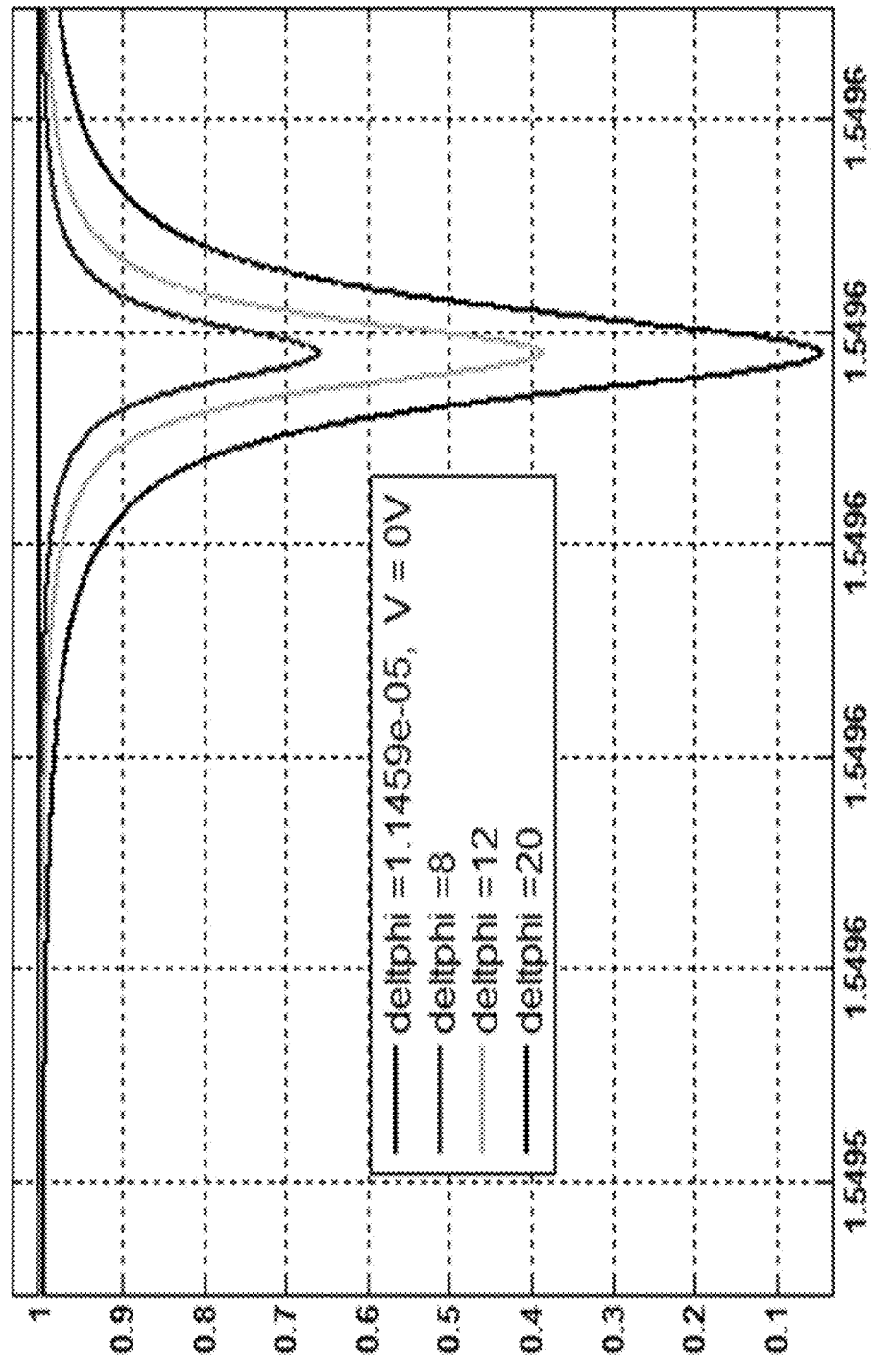
FIG. 4 depicts the transmission spectra for a prototype SOI ring resonator PAM-4 modulator according to an embodiment of the invention as depicted in FIG. 2.
Figure 5:
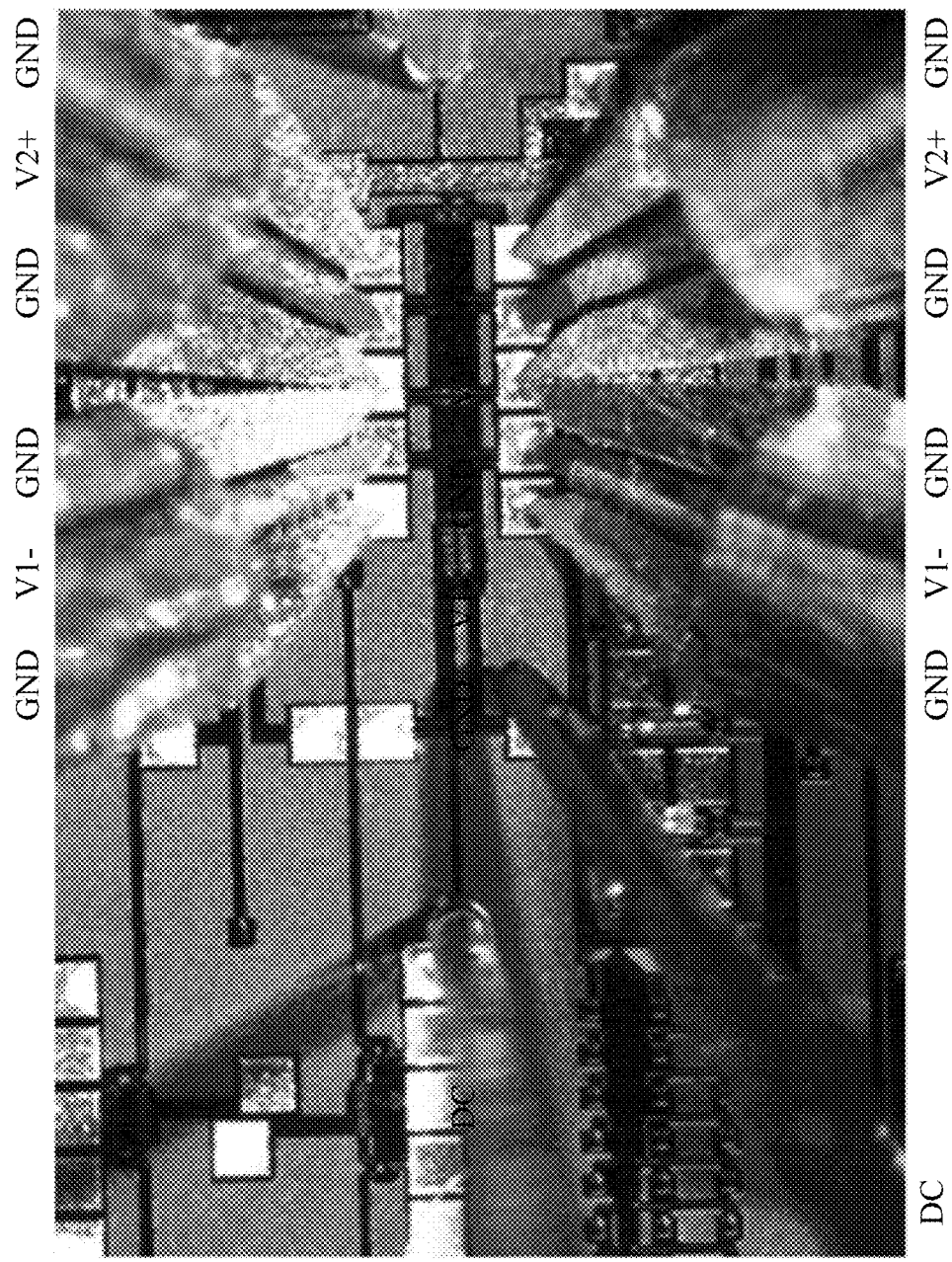
FIG. 5 depicts a prototype SOI ring resonator PAM-4 modulator within a test station according to an embodiment of the invention as depicted in FIG. 2.

Referring to FIG. 3 there is depicted a mask schematic of a silicon-on-insulator (SOI) development test block 300 and a SOI RR-MZI PAM-4 modulator 350 according to an embodiment of the invention as depicted in FIG. 2. Within test block 300 nine PAM-4 modulators 350 were implemented, three with forward-bias PIN diodes for bias and drive, three with forward-bias PN diodes, and three with reversed-bias PN diode. Accordingly, the interface to the RR-MZI 350 is 11 electrical connections and 2 optical connections. The 11 electrical connections are composed of Ground-Signal-Ground-Signal-Ground (GSGSG) RF pads on each side for the pair of drive electrodes and a single DC pad for overall phase bias control of the MZI. Simulated transmission spectra versus wavelength for the RR-MZI 350 at the different "states" is depicted in FIG. 4 whilst FIG. 5 depicts an SOI RR-MZI modulator according to FIG. 2 within a test-setup wherein coplanar waveguide probes are employed to provide the GSGSG RF connections in a manner that is actually GSGGSG.

Figure 6:
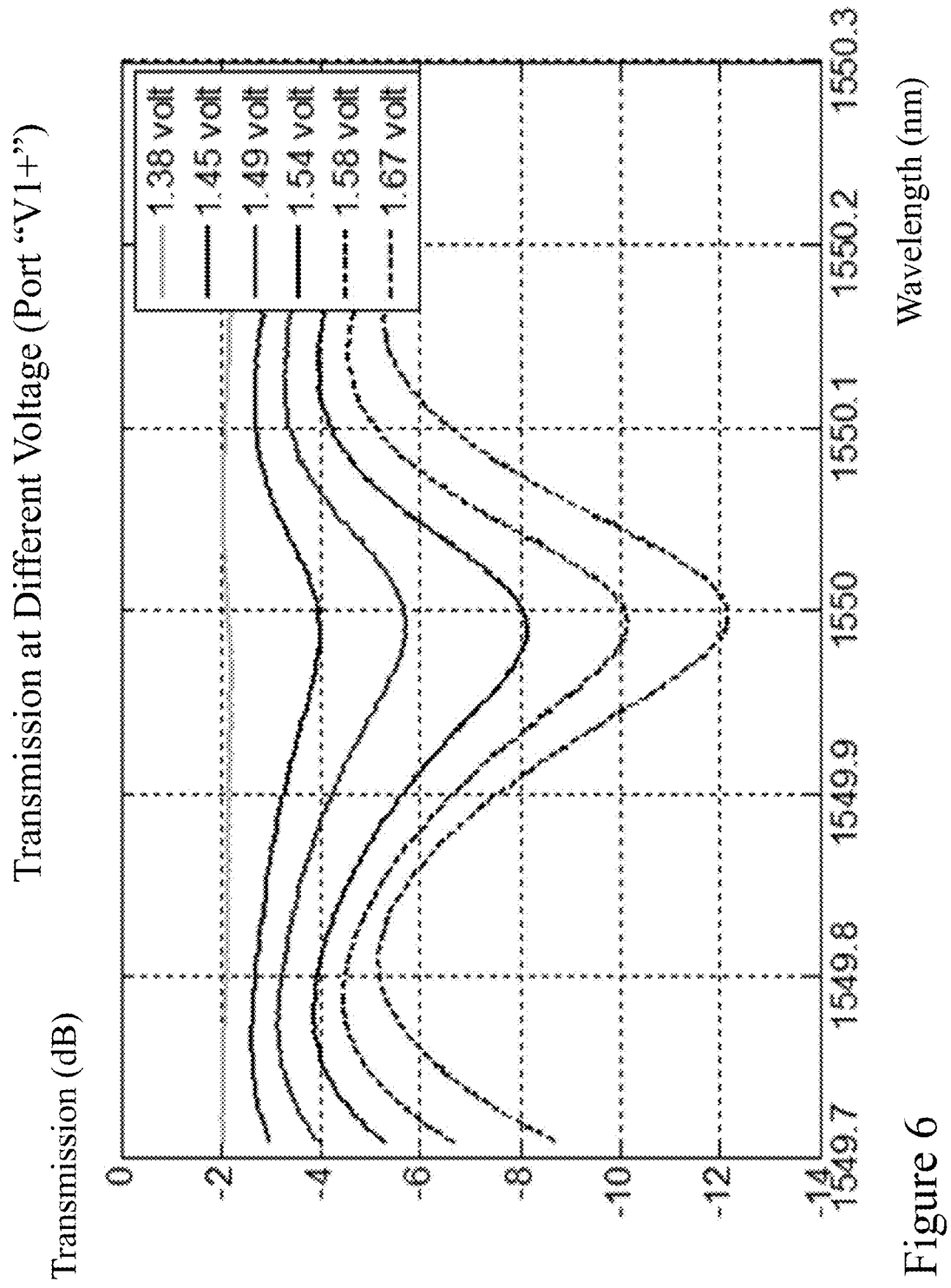
FIG. 6 depicts the transmission spectra for a prototype SOI ring resonator PAM-4 modulator according to an embodiment of the invention as depicted in FIG. 2.

Referring to FIG. 6 there are depicted experimental data for the RR-MZI modulator according to the design depicted in FIG. 2. For $V_{DC}=5.92V$, $V_{1-}=1.55$ and $V_{2+}=1.338$ V as the $V_{1+}$ voltage is varied from 1.38V to 1.67V then the RR-MZI modulator exhibits a 10 dB extinction ratio for 300 mV drive change. Maintaining these settings and varying $1.338V \leq V_{2+} \leq 1.528$ V yielded a 10 dB extinction ratio for 200 mV swing and a resulting wavelength shift in maximum extinction of 0.5 Å. As evident the extinction ratio is limited due to imbalances in the directional couplers, i.e. not exactly 50:50 split ratio, and strip waveguide sensitivities to manufacturing variations. Optionally, DC bias could be employed to tune the directional couplers to 50:50 as known within the prior art.

PAM-N Modulator Driver and Interface Circuit

Figure 7:
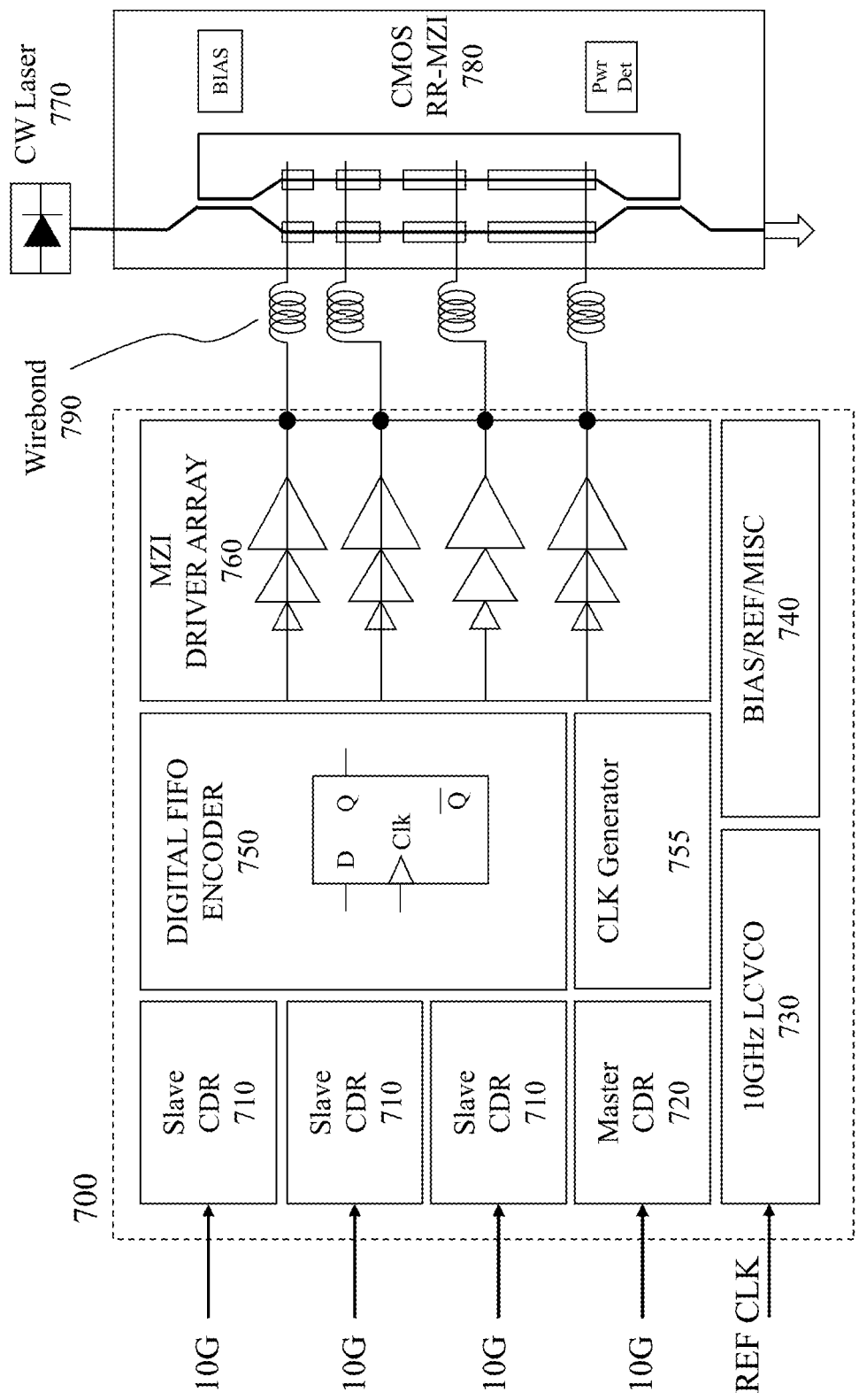
FIG. 7 depicts a PAM-4 driver circuit according to an embodiment of the invention.

The RR-MZI modulator depicted in FIG. 2 operates using 2-bits/symbol according to PAM-4 with 4 output amplitude levels. However, this can be extended (or generalized) to N-bits per symbol yielding $2^N$ levels in the transmitter eye-diagram such that 3-bits/symbol is 8 levels (PAM8) and 4-bits/symbol is 16 levels (PAM16), for example. Referring to FIG. 7 there is depicted a PAM16 modulator driver circuit. As depicted 4 10 Gb/s data signals are coupled to three slave clock data recovery (CDR) circuits 710 and a master CDR 720 which receive clocking information from a LC voltage controlled oscillator (VCO) 730 which receives a reference clock and in addition to clocking the master and slave CDR circuits 710 and 720 respectively also generates clock signals in clock generator circuit 755 which are coupled to Digital FIFO Encoder 750 and therein be coupled to the four driver circuits within the MZI driver array 760 which generate the appropriate voltages for each electrode pair within the Mach-Zehnder section of the CMOS RR-MZI 780 via wire bonds 790.

Optionally, in order to address non-linearities within PAM-N modulators the driving signals may be offset from their nominal positions and/or the thresholds within the receiver circuit may be similarly adjusted.

PAM-4 Ring Resonator Mach-Zehnder Interferometers—Design 2

Figure 8:
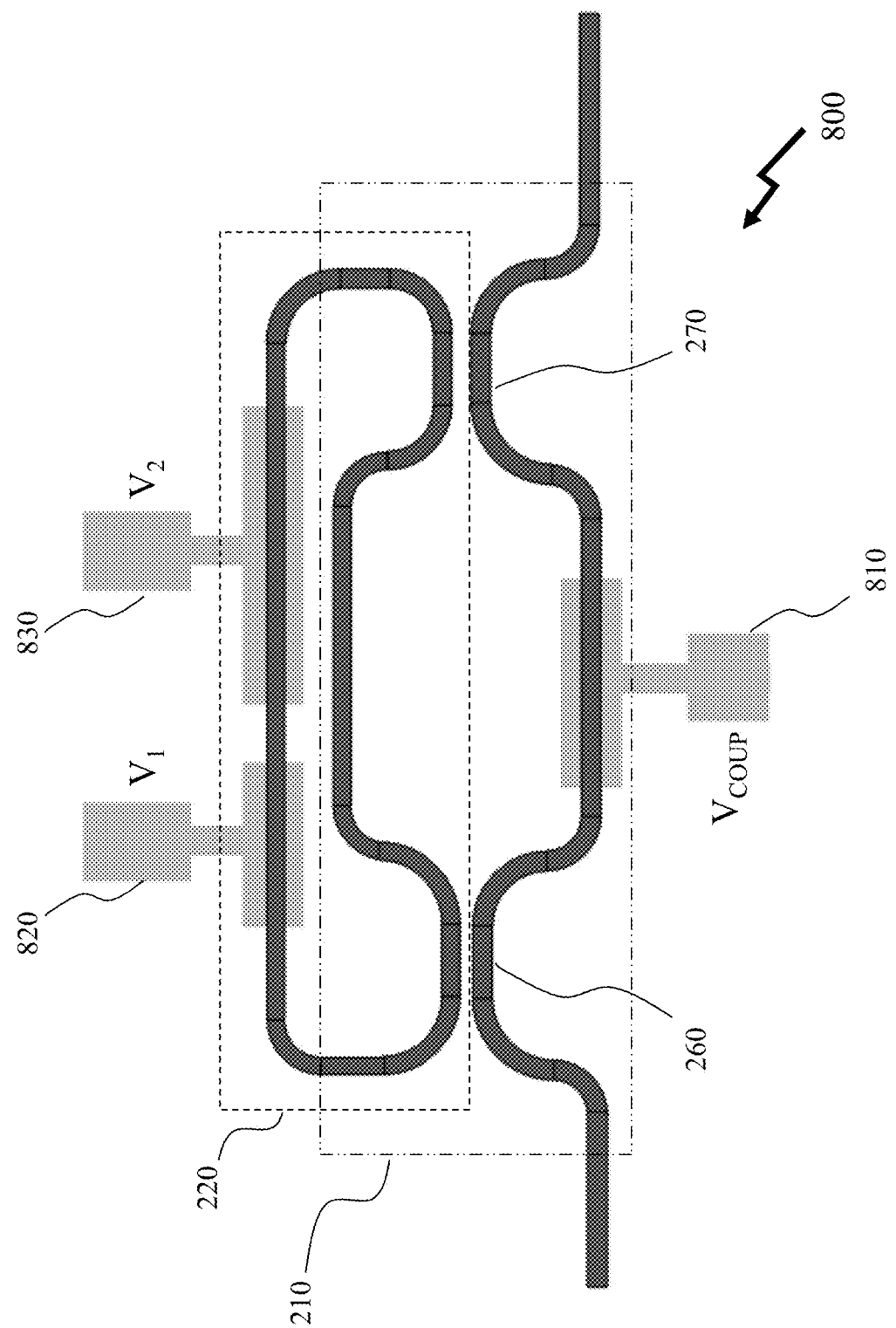
FIG. 8 depicts an intercavity ring resonator PAM-4 modulator according to an embodiment of the invention.

Now referring to FIG. 8 there is depicted a PAM-4 ring resonator Mach-Zehnder interferometer (RR-MZI) 800 according to an embodiment of the invention. Here, again, the Mach-Zehnder interferometer (MZI) 210 and ring resonator 220 are clearly evident sharing the two directional couplers 260 and 270 and one arm of the MZI. However, in this embodiment of the invention the MZI coupler is used to tune the power coupling ratio of the ring resonator only and two active diode sections are implemented within the ring cavity for modulation. Accordingly, the coupling control electrode 810 is disposed within the arm of the MZI 210 not shared with the ring resonator 220 whilst the first and second drive electrodes 820 and 830 are disposed in the portion of the ring resonator 220 not common with the MZI 210.

Accordingly, the PAM-4 RR-MZI 800 design methodology adds a degree of freedom with respect to controlling the power coupling ratio in order to achieve the desired four levels at the output of the modulator with sufficient modulation depth. According to an SOI implementation of the PAM-4 RR-MZI 800 the two diode segments have lengths of 29 μm and 44 μm respectively. The segments are driven by two electrical signals $V_1$ (least significant bit, LSB) and $V_2$ (most significant bit, MSB), respectively. As noted above the length of the diode segments is chosen such that unique and non-uniform phase shift is achieved for each of the four possible electrical input conditions generated by applying $<V_1:V_2>$.

Within embodiments of the invention the diodes were manufactured using p and n doping regions on both sides of the ridge section of the SOI waveguides within the portion of the ring resonator 220 not common with the MZI 210. Within the lower waveguide arm of the MZI 210 a resistor was designed using p-type doping on the SOI waveguide in order to exploit thermal induced phase shifting of the MZI 210. The length of the resistor was 83 μm. An exemplary manufacturing sequence with diode and resistor active sections for a modulator can be found in Liow et al. entitled "Silicon Modulators and Germanium Photodetectors on SOI: Monolithic Integration, Compatibility, and Performance Optimization" (IEEE J. Sel. Top. Quantum Electron., Vol. 16(1), pp. 307-315).

Figure 10A:
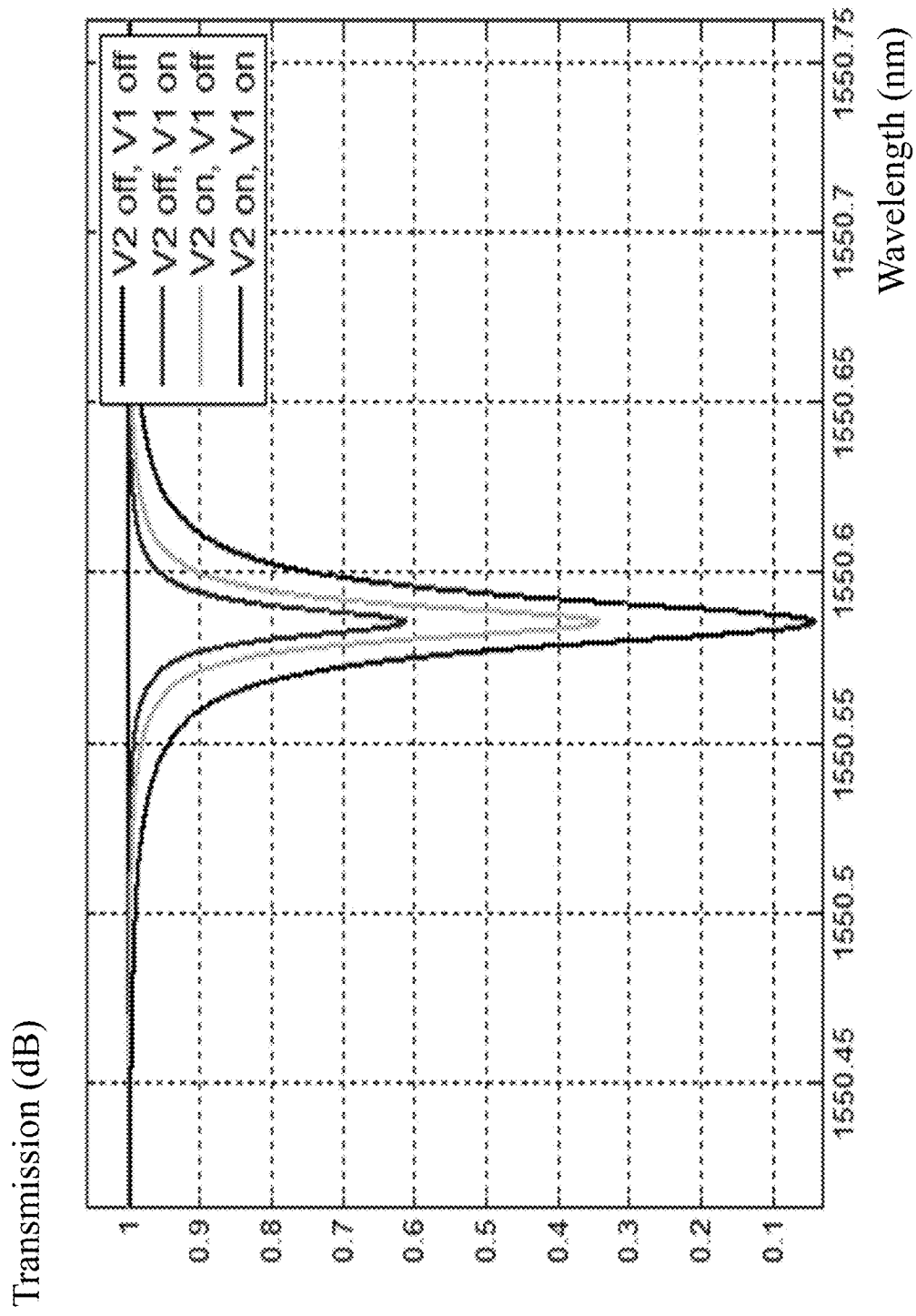
FIG. 10A depicts simulated transmission spectra for a ring resonator PAM-4 modulator according to an embodiment of the invention as depicted in FIG. 8.
Figure 10B:
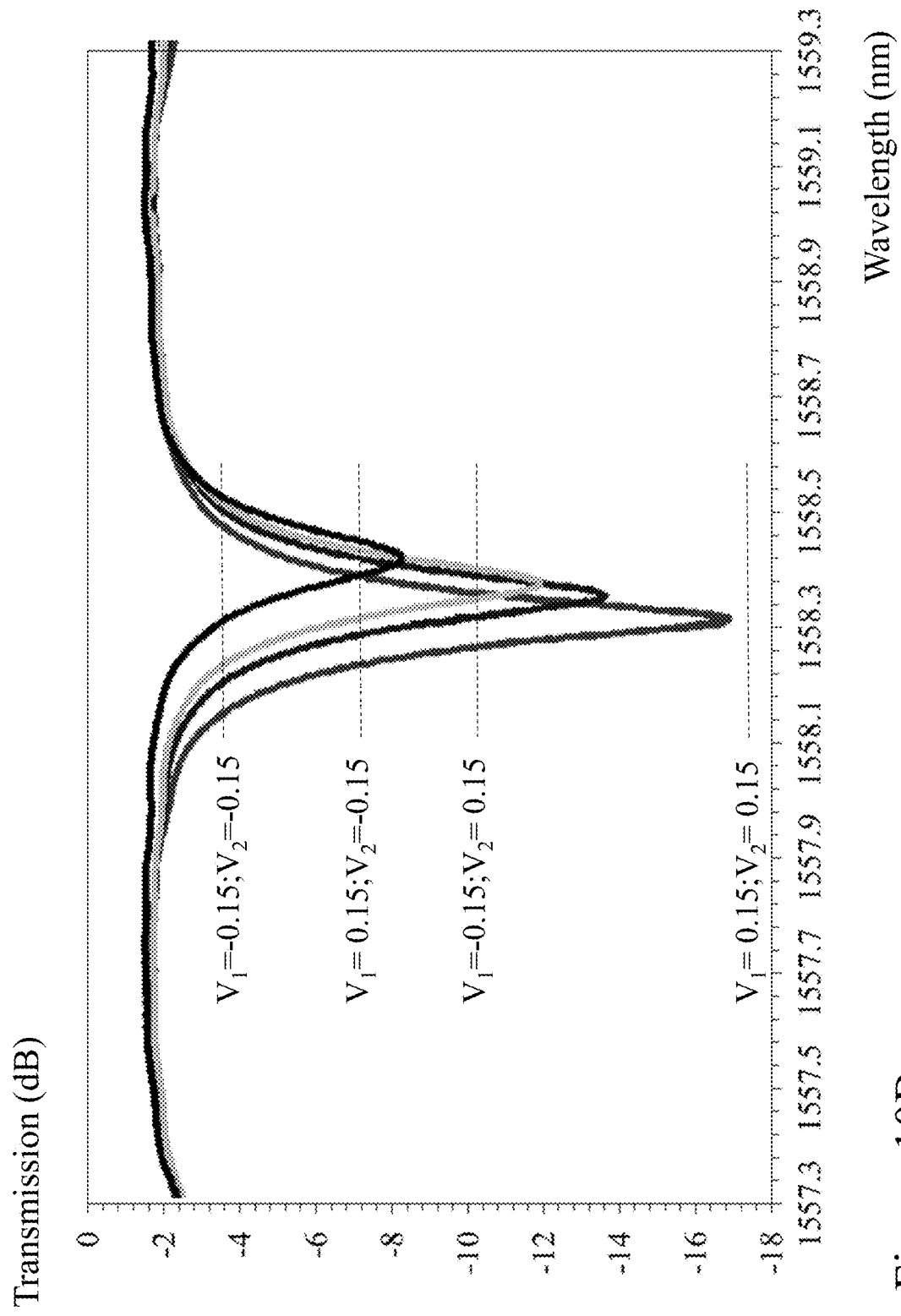
FIG. 10B depicts experimental transmission spectra for a ring resonator PAM-4 modulator according to an embodiment of the invention as depicted in FIG. 8.

In order to rapidly determine the amplitude and DC bias of the electrical driving voltages and the resonance wavelength, a broadband optical source was used at the input of the modulator. FIG. 10A depicts the spectral response of the modulator recorded on an optical spectrum analyzer (OSA) at four input voltage conditions indicating. Next, a +2 dBm CW laser source at the modulator resonance wavelength of 1550.32 nm was employed. Table 4 presents the absolute optical power recorded on the OSA at the DC voltage levels shown in FIG. 10B indicating an extinction ratio of approximately 28 dB. Simulation results are presented in FIG. 10A.

TABLE 4

Experiment Results for RR-MZI of Design B

| Vcoup (DC) | V1 (RF/DC) $V_1$bias = 1.43 V | V2(RF/DC) $V_2$bias = 1.34 V | DC $P_{out}$ (dBm) | $P_{out}$ Linear (norm.) |
|---|---|---|---|---|
| 1.07 | 0.11/0.15 | 0.12/0.15 | −42.4 | 0.001 |
| 1.07 | 0/−0.15 | 0.12/0.15 | −20.15 | 0.26 |
| 1.07 | 0.11/0.15 | 0/−0.15 | −17.17 | 0.52 |
| 1.07 | 0/−0.15 | 0/−0.15 | −14.38 | 1 |

The drive current for the phase shifter was approximately 7 mA whilst the drive currents for $V_1$ were 1 mA/5 mA and $V_2$ were 2 mA/7 mA. The four optical power levels suggest that there is a small power non-uniformity between two consecutive optical power levels. Therefore, when driving the modulator with RF signal the bias voltages and RF signal amplitude need to be tuned to achieve equal voltage difference between two consecutive levels in the electrical eye diagram after photodetection. Table 4 also lists the modified DC bias and RF peak to peak amplitude values.

Figure 9:
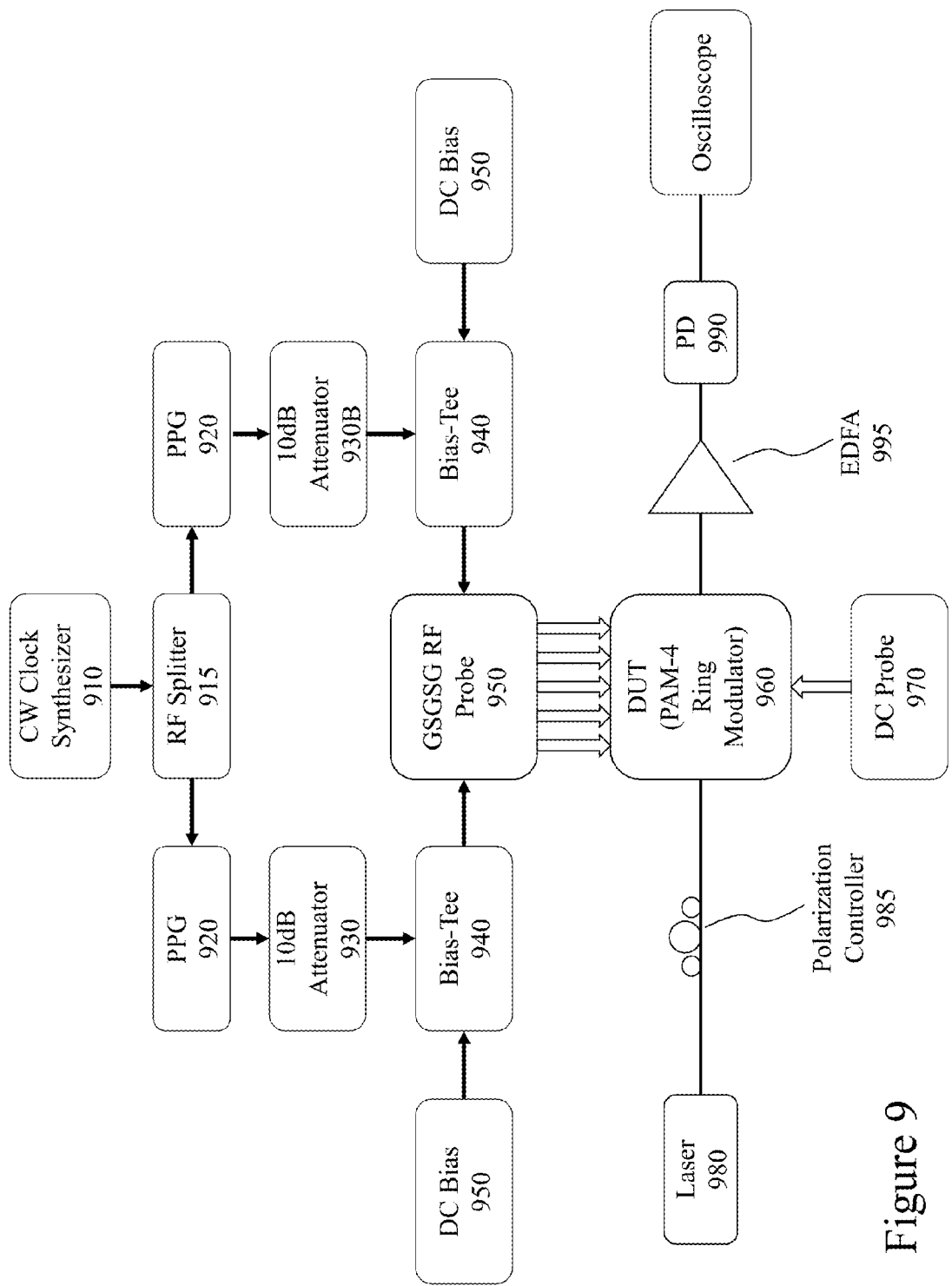
FIG. 9 depicts an experimental test configuration for testing an intercavity ring resonator PAM-4 modulator according to an embodiment of the invention as depicted in FIG. 8.

Subsequently, as depicted in FIG. 9 an erbium doped fiber amplifier (EDFA) 995 and a 10 GHz photodetector with 0.3 V/mW opto-electric conversion efficiency were used at the output of the RR-MZI modulator to obtain an open eye diagram. The RR-MZI modulator was driven by two data signals generated from a CW clock synthesizer 910 wherein the output is split by RF splitter 915 and each output from the RF splitter 915 goes through a chain of programmable pulse generator (PPG) 920, 10 dB attenuator 930, and bias-tee 940 before being coupled to the RR-MZI modulator via an RF probe. Each bas-tee 940 is also connected to a DC bias source 950 and the DC heater is coupled to DC Probe 970 and therein DC power source, not shown for clarity. The laser 980 output was adjusted via a polarization controller 985 for launch into the SOI RR-MZI modulator.

Figure 11A:
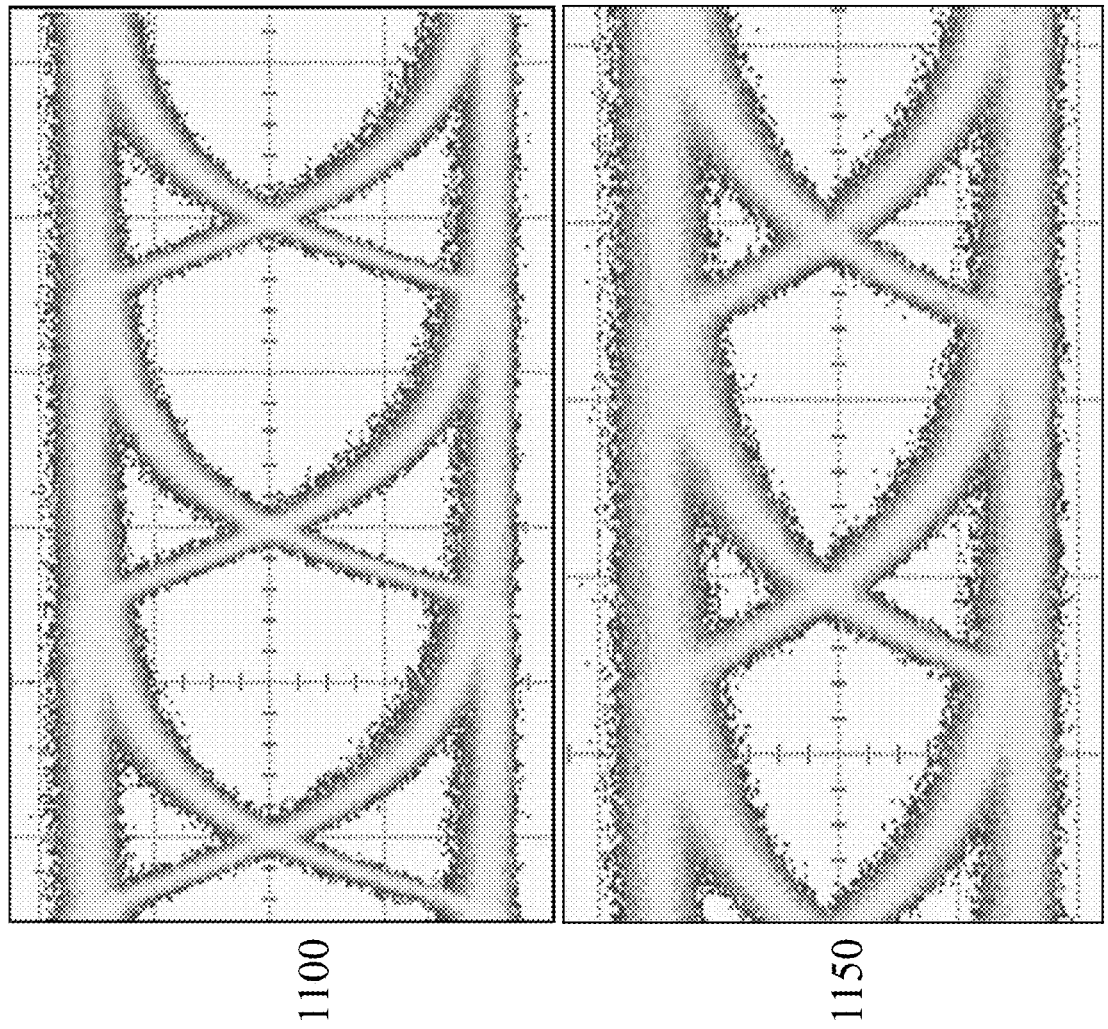
FIGS. 11A and 11B depict transmission eye-diagrams for a ring resonator PAM-4 modulator according to an embodiment of the invention as depicted in FIG. 8.
Figure 11B:
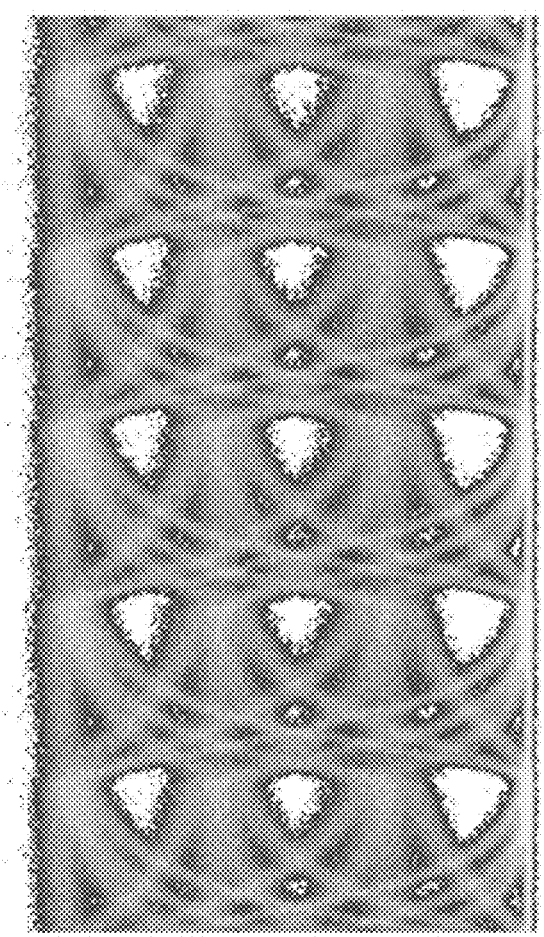

FIG. 11A depicts electrical eye diagram results for the RR-MZI modulator according to design B when it is driven by $V_1$ and $V_2$ one at a time in first and second eye diagrams 1100 and 1150 respectively. The peak to peak voltage amplitude of the modulated signal for $V_1$ is smaller (approximately half) than that of $V_2$ as the diode segment (or phase shifter length) is smaller for $V_1$. Now referring to FIG. 11B there is depicted a third eye-diagram depicting the output of the RR-MZI PAM-4 modulator when driven simultaneously with $V_1$ and $V_2$ at the levels shown in Table 4. From this figure it is evident that the signal which transits from level 0 to level 3, reaches level 2 with faster rise time, compared to the rise time of the signal which transits from 0 to 2. Consequently, the bit rate speed of this forward biased RR-MZI modulator may be increased by exploiting a pre-emphasized driving signal. Even without the pre-emphasized driving signal and modification of decision thresholds/driving thresholds the RR-MZI PAM-4 modulator operates with low-voltage drive in a forward biased operating mode with a 6.5 dB extinction ratio.

It would be evident that the RR-MZI modulator depicted in FIG. 8 may be similarly implemented as a PAM8, PAM 16 modulator such as described above.

Figure 12:
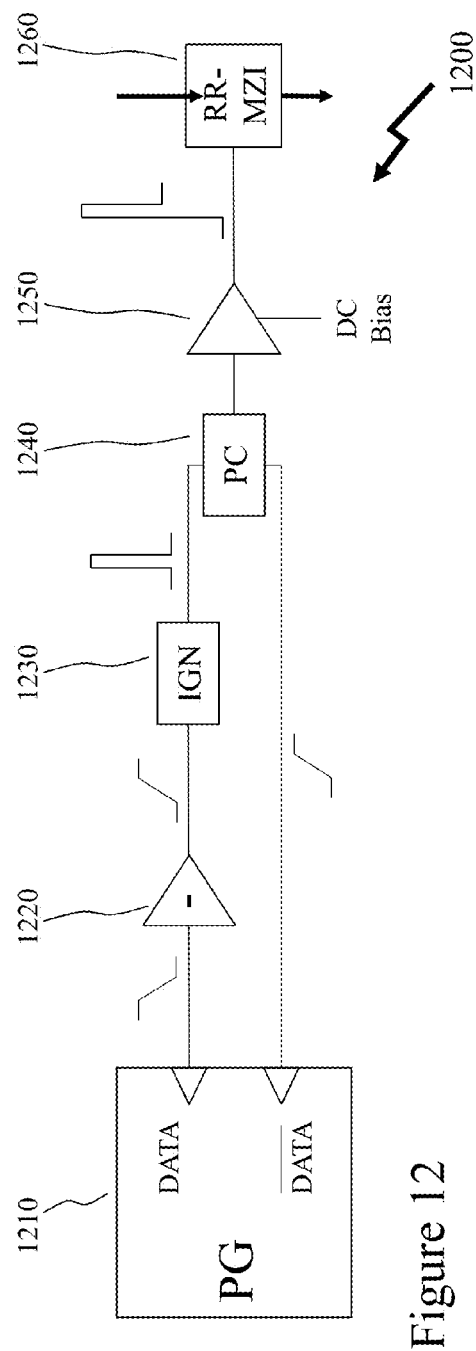
FIG. 12 depicts an electrical circuit for generating a pre-emphasized driving signal for forward biased operation of a ring resonator PAM-4 modulator according to an embodiment of the invention as depicted in FIG. 8.
Figure 13:
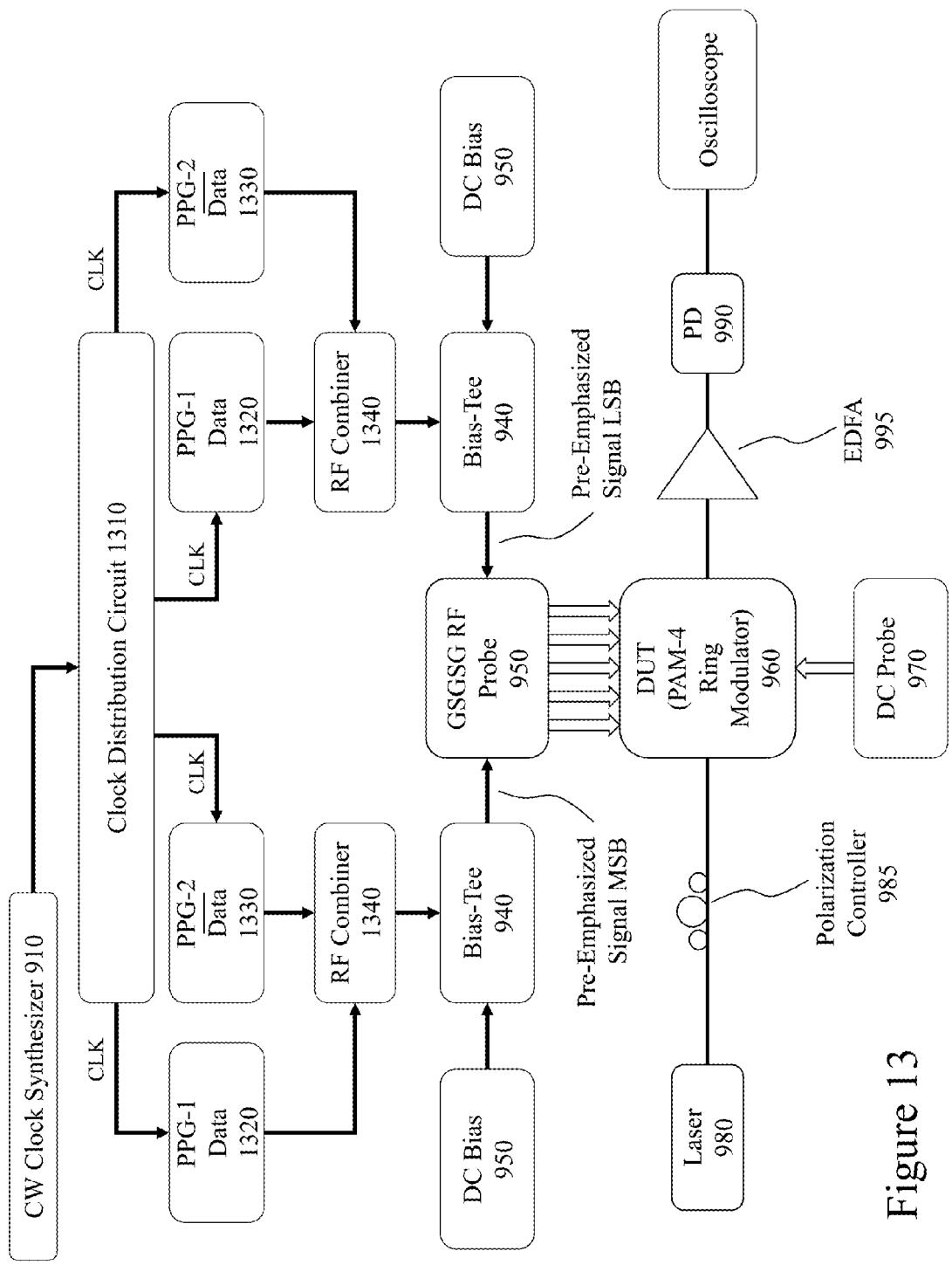
FIG. 13 depicts an experimental test configuration for testing an intercoupling ring resonator PAM-4 modulator according to an embodiment of the invention as depicted in FIG. 14.

Accordingly, referring to FIG. 12 there is depicted a pre-emphasis driving circuit 1200 for an RR-MZI. As depicted a pulse generator 1210 (or alternatively the data source) provides DATA and $\overline{DATA}$ signals. The DATA signal is coupled to an inverter 1220 and therein to an impulse generator network 1230 which is basically a differentiator that generates an impulse at each rising or falling transition of the DATA signal. The output of the IGN 1230 is combined with the $\overline{DATA}$ signal in combiner 1240 before being amplified by amplifier 1250 and coupled to the RR-MZI 1260. Such a pre-emphasis driving signal was generated using a variant of the test configuration described above in respect of FIG. 9 which is depicted in FIG. 13 and employed to test a PAM-4 ring resonator according to a third design as described below. Accordingly, the CW Clock Synthesizer 910 provides a clock signal to a Clock Distribution Circuit 1310 which provides the clock to a pair of first programmable pulse generators PPG-1 1320 which each generate the DATA signal and to a pair of second programmable pulse generators PPG-2 1330 which each generate the $\overline{DATA}$ signal. The outputs of a PPG-1 1320 and PPG-2 1330 are combined within an RF Combiner 1340 and coupled to one of the bias-tees 940 in order to generate the pre-emphasized most significant bit (MSB) and pre-emphasized least significant bit (LSB) control signals for the DUT 960.

PAM-4 Ring Resonator Mach-Zehnder Interferometers—Design 3

Figure 14:
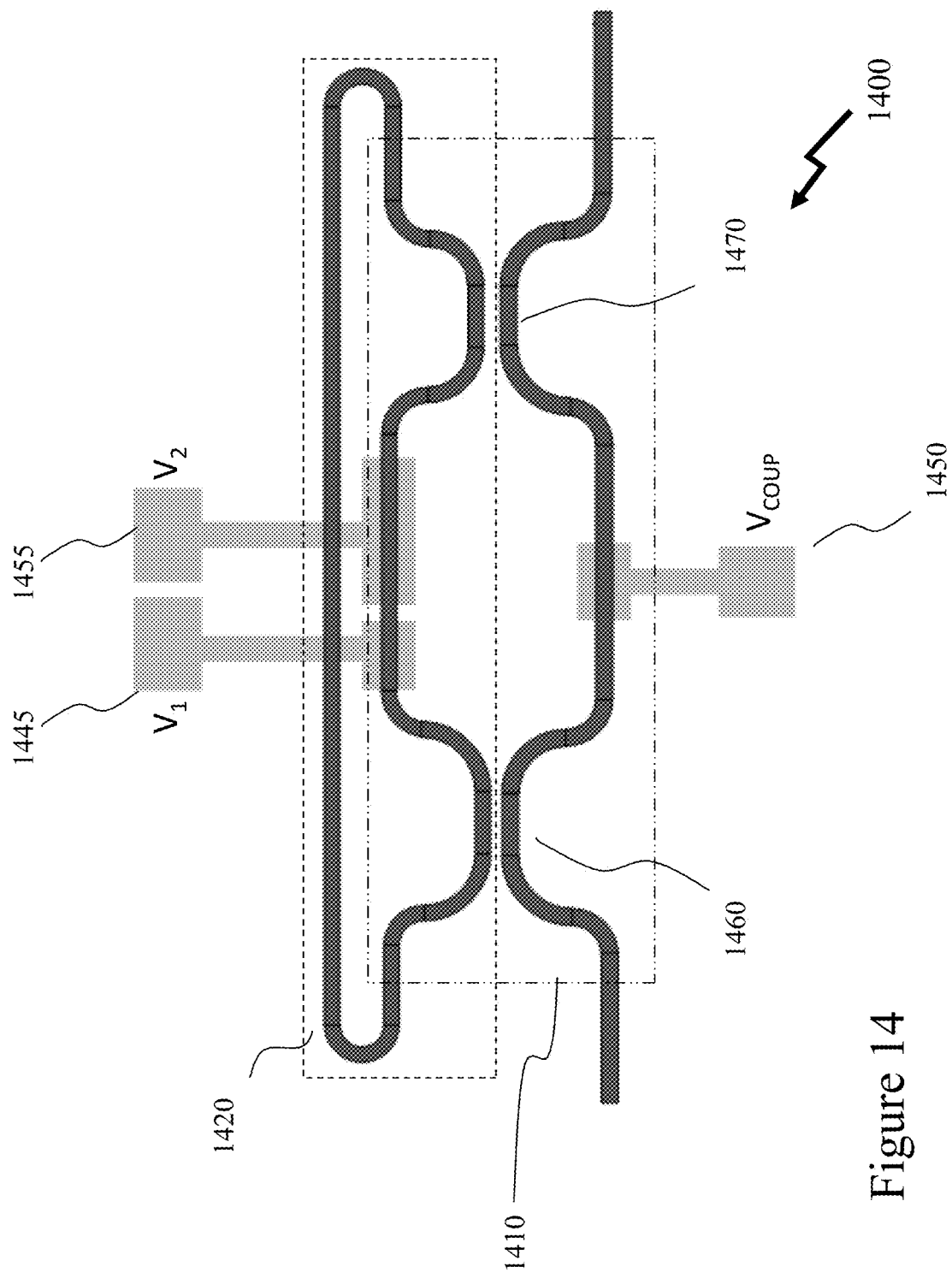
FIG. 14 depicts an intercoupling ring resonator PAM-4 modulator according to an embodiment of the invention.

Referring to FIG. 14 there is depicted a PAM-4 ring resonator Mach-Zehnder interferometer (RR-MZI) 1400 according to an embodiment of the invention. Here, again, the Mach-Zehnder interferometer (MZI) 1410 and ring resonator 1420 are clearly evident sharing the two directional couplers 1460 and 1470 and one arm of the MZI. Also depicted is the coupling electrode 1450 which in operation of the RR-MZI allows the coupling ratio into the ring resonator 1420 portion of the RRMZI 1400 to be adjusted. Also depicted are first and second electrodes 1445 and 1455 respectively which modify the net phase shift thereby generating a modulated optical output signal in dependence upon the signals applied to the first and second electrodes 1445 and 1455 respectively. Accordingly with appropriate selection of the two generated phase shifts then applying data simultaneously data for 2-bits to the RR-MZI 1400 will yield 4 output levels dependent upon the logic state of each bit, and hence a PAM-4 modulation scheme.

Figure 15:
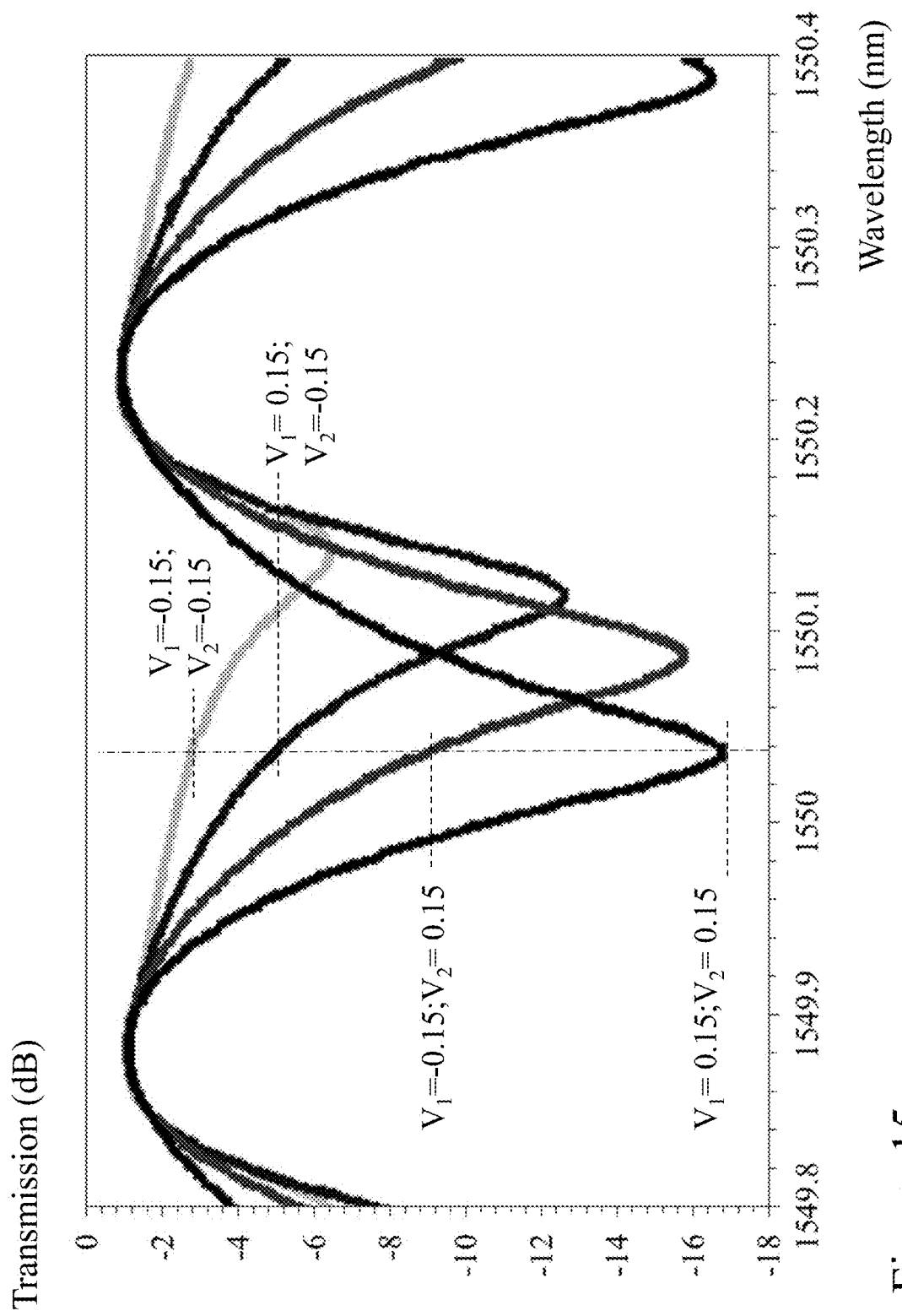
FIG. 15 depicts normalized transmission spectra for a ring resonator PAM-4 modulator according to an embodiment of the invention as depicted in FIG. 14.
Figure 16:
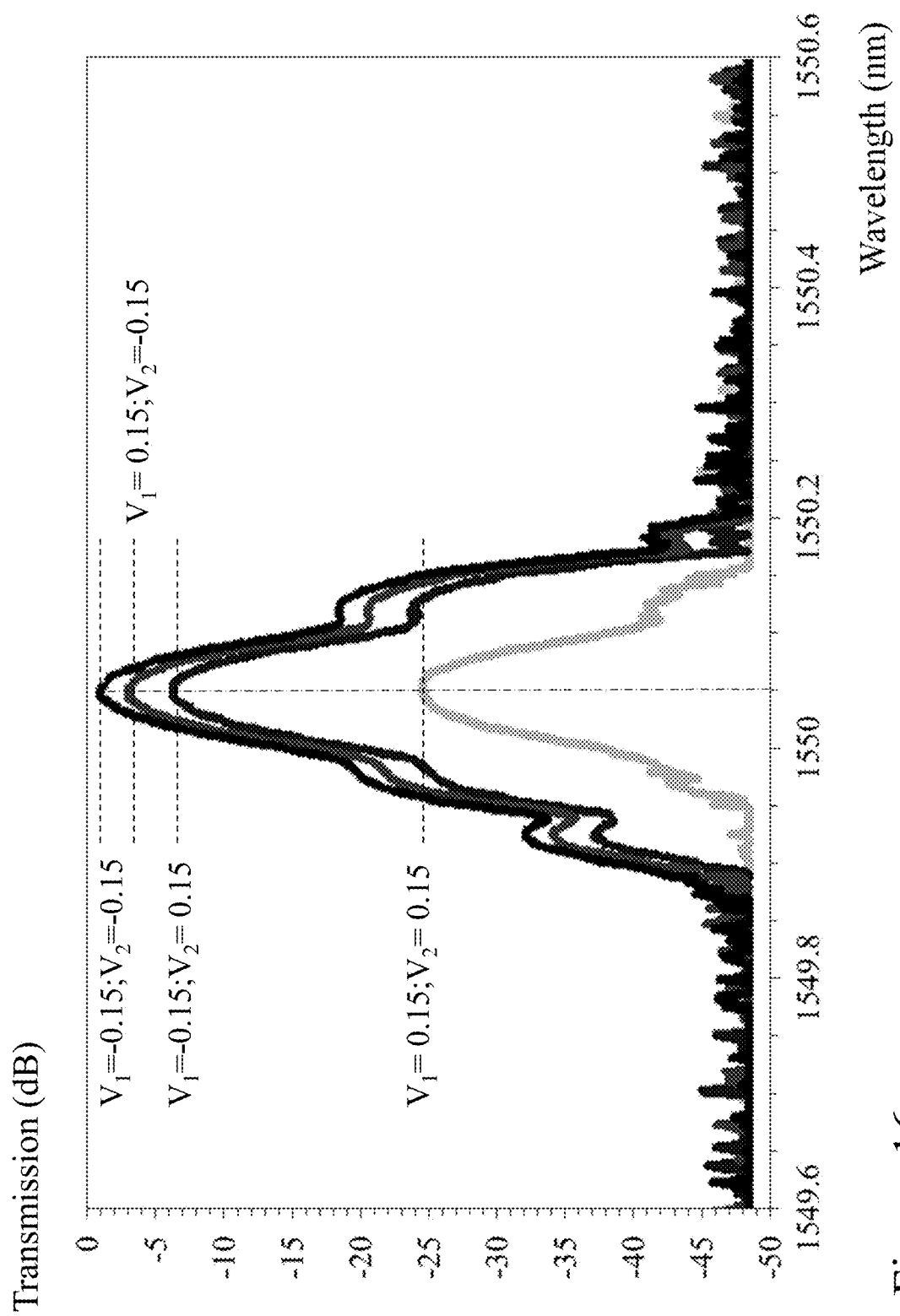
FIG. 16 depicts the normalized transmission spectra for a ring resonator PAM-4 modulator according to an embodiment of the invention as depicted in FIG. 14.

Now referring to FIG. 15 there is depicted the normalized optical transmission of an RR-MZI 1400 based modulator at different DC bias values. As before, an EDFA was used at the input side. The normalized transmission curve shows around 2.5 dB transmission loss in the modulator. From FIG. 15 it can be seen that with the change in the DC bias voltage the resonance wavelength shifts but the maximum transmission point does not showing that the ring modulator works in the coupling modulation region. Under the same DC bias voltage conditions the normalized transmission spectra of the SOI-based RR-MZI 1400 are depicted in FIG. 16 using a CW laser as the input source. In each instance the bias voltages $V_1$ and $V_2$ applied to each of the first and second drive electrodes was set to 1.25V.

Figure 17:
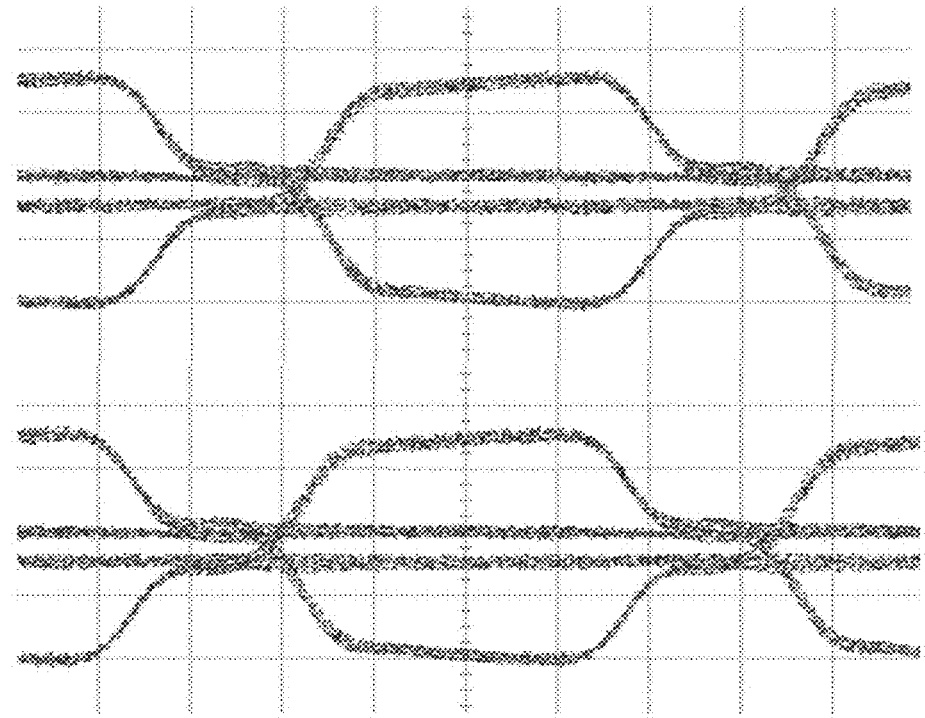
FIG. 17 depicts the 3 Gb/s pre-emphasized electrical signal used to drive the modulator generated with the test circuit depicted in FIG. 13.
Figure 18:
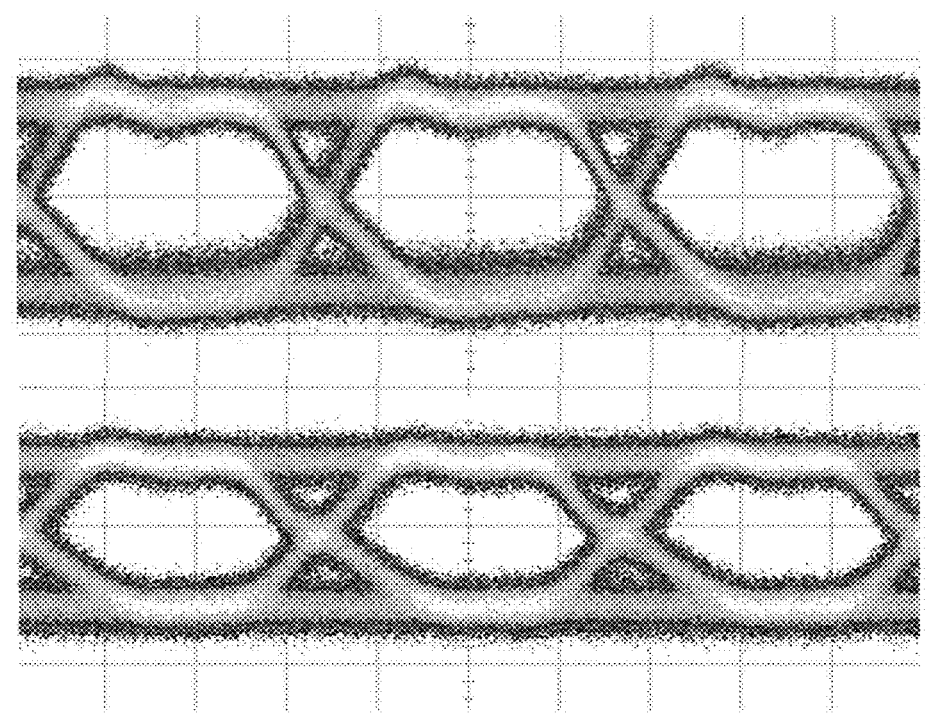
FIG. 18 depicts the electrical eye diagram from a ring-resonator PAM-4 modulator according to an embodiment of the invention as depicted in FIG. 14 when driven with one or other of LSB and MSB 120 Mb/s pre-emphasized electrical signals.
Figure 19:
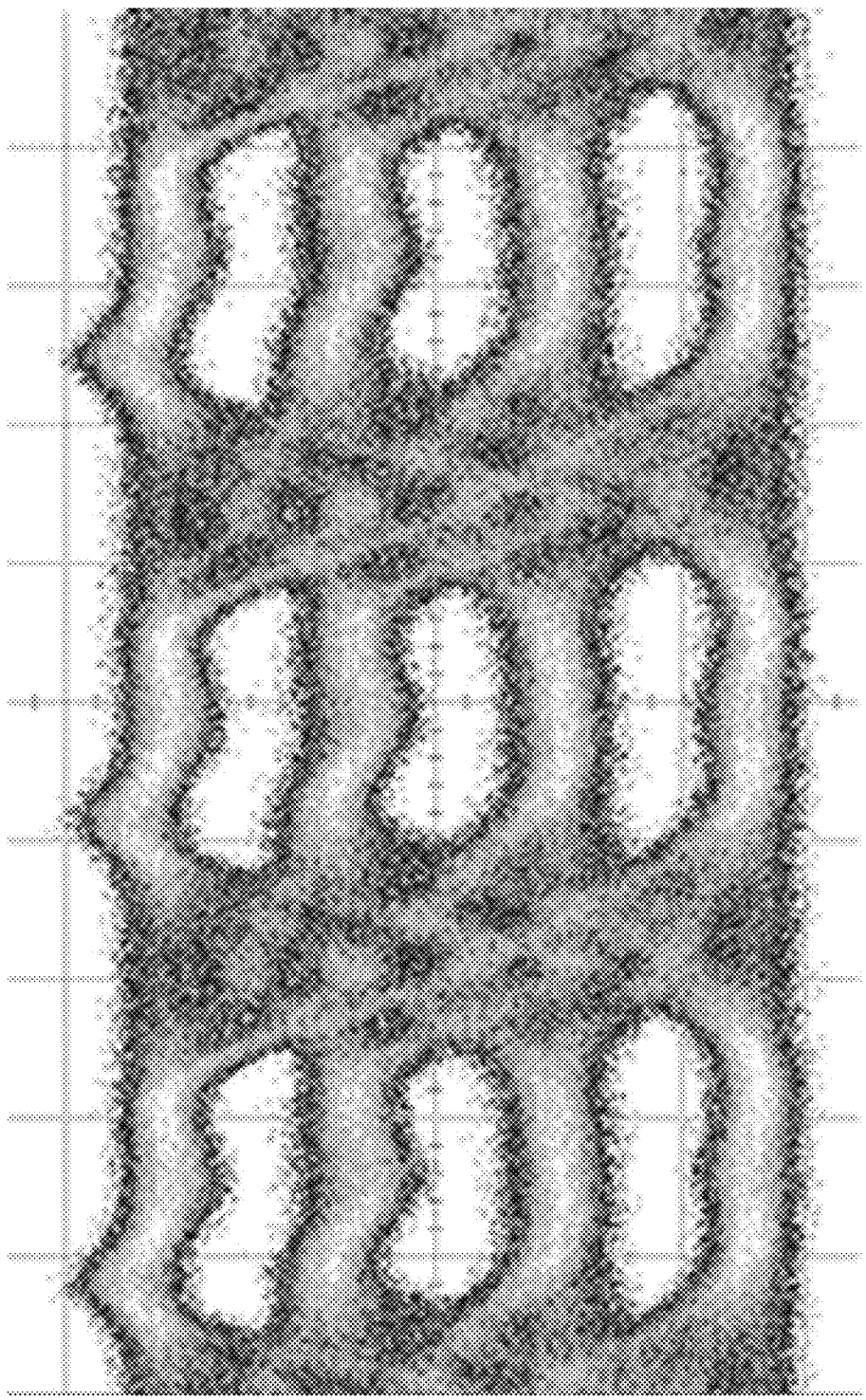
FIG. 19 depicts the electrical eye diagram from a ring-resonator PAM-4 modulator according to an embodiment of the invention as depicted in FIG. 14 when driven with LSB and MSB 3 Gb/s pre-emphasized electrical signals as depicted in FIG. 17.

Referring to FIG. 17 there are depicted 3 Gb/s pre-emphasized electrical signals used to drive an RR-MZI modulator 1400 according to an embodiment of the invention using the test circuit configuration depicted in FIG. 13. The profile of the rising and falling edges of each driving signal clearly present the pre-emphasis described in respect of FIG. 12. FIG. 18 shows first and second electrical eye diagrams 1750 and 1700 respectively from the RR-MZI modulator 1400 when it is driven by $V_1$ (LSB) and $V_2$ (MSB), one at a time, with 120 Mb/s pre-emphasised driving signals. The peak to peak voltage amplitude of the modulated signal for $V_1$ of approximately 22 mV is smaller (approximately half) than that of $V_2$, approximately 40 mV, as the diode segment (or phase shifter length) is smaller for $V_1$. The photodetector used to detect the modulated signal has a responsivity of 0.7 A/W. Then when driving the RR-MZI modulator with a PAM-4 3 Gb/s electrical drive the electrical eye diagram for the modulator output is depicted in FIG. 19 where much more open eyes are now evident as a result of the pre-emphasis in the electrical driving signals and the four levels of the PAM-4 RR-MZI modulator output clearly evident.

PAM-4 Ring Resonator Mach-Zehnder Interferometers—Design 4

Figure 20:
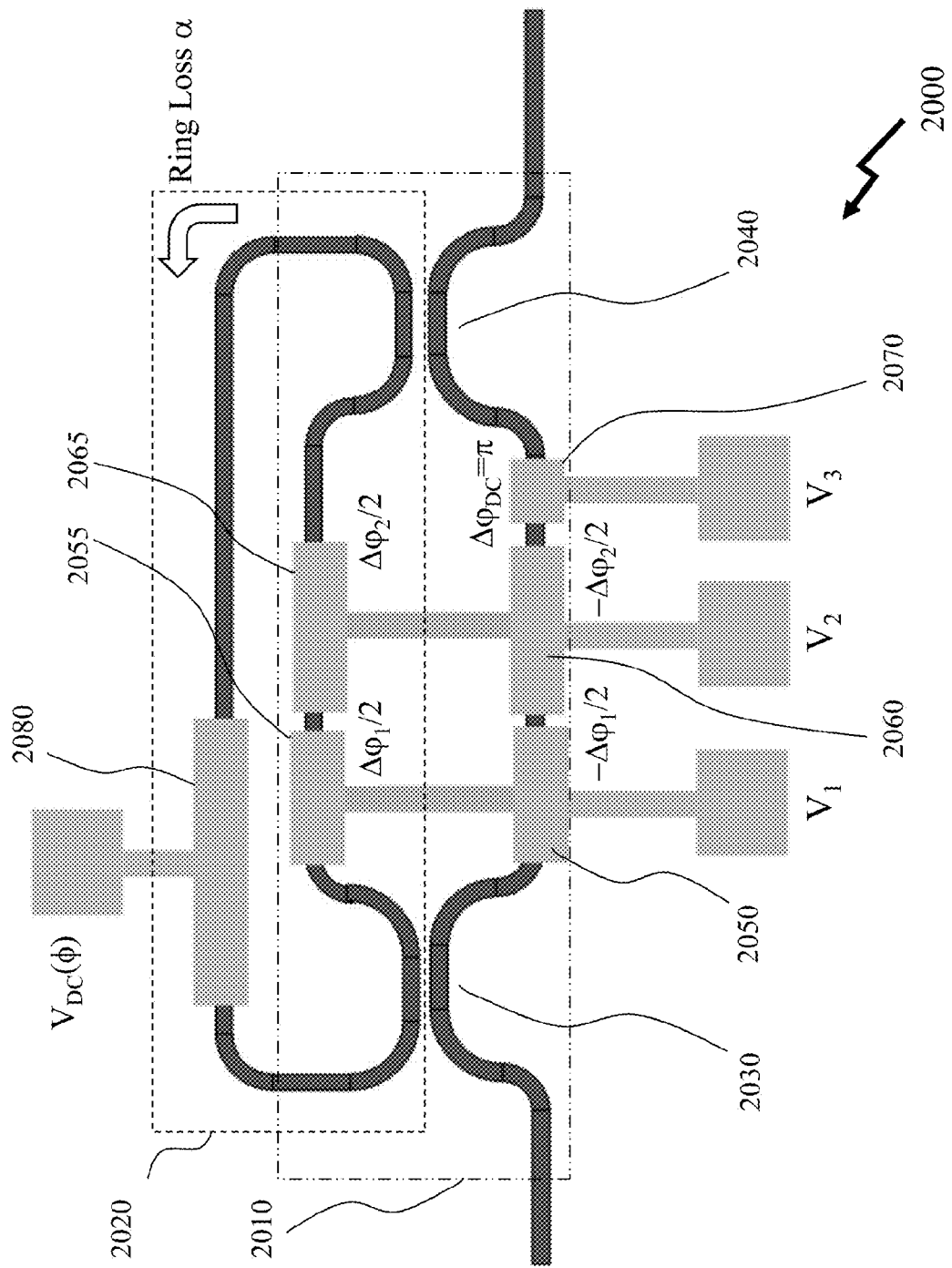
FIG. 20 depicts an intercavity ring resonator PAM-4 modulator according to an embodiment of the invention.

Now referring to FIG. 20 there is depicted a PAM-4 ring resonator Mach-Zehnder interferometer (RR-MZI) 2000 according to an embodiment of the invention. Here, again, the Mach-Zehnder interferometer (MZI) 2010 and ring resonator 2020 are clearly evident sharing the two directional couplers 2030 and 2040 and one arm of the MZI. Within the MZI 2020 there are depicted first and second electrodes 2050 and 2060 on one arm and third and fourth electrodes 2055 and 2065 on the other arm which driven in pairs from first and second contacts $V_1$ and $V_2$ representing the drive signals. By appropriate design the first and second electrodes 2050 and 2060 induce a phase shift in the opposite direction of that induced in third and fourth electrodes 2055 and 2065 respectively such that the MZI 2010 operates in a push-pull mode. The bias point of the MZI 2010 being established from the fifth electrode 2070 within the MZI 2010 which may also be implemented as a push-pull configuration and is biased to induce a phase shift of $\pi$ within the MZI 2010. Also depicted is the ring resonator biassing electrode 2080. Analysis of the push-pull modulation based inter-coupling PAM-4 ring resonator modulator shows that reduced phase shift is required for shifting output from 0% to 100% or vice-versa. Within a conventional Mach-Zehnder interferometer the required phase shift is $\pi$, whereas the RR-MZI 2000 requires a phase shift of $2 \cdot \cos^{-1}(\alpha)$. Application of the reverse bias results in bandwidth enhancement of the RR-MZI without requiring pre-emphasis of the electrical driving signal.

Figure 21:
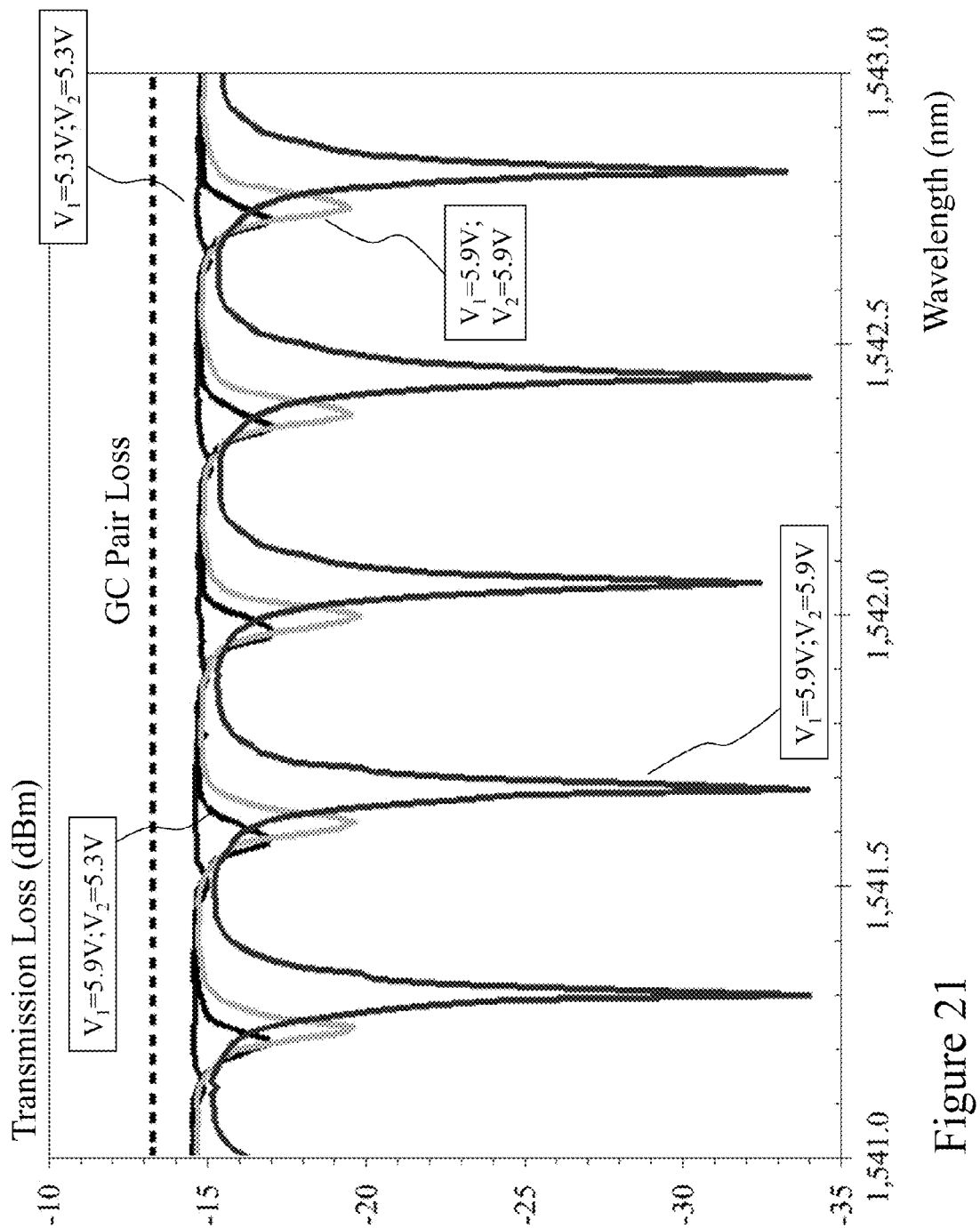
FIG. 21 depicts experimental transmission spectra for a ring resonator PAM-4 modulator according to an embodiment of the invention as depicted in FIG. 20.
Figure 22:
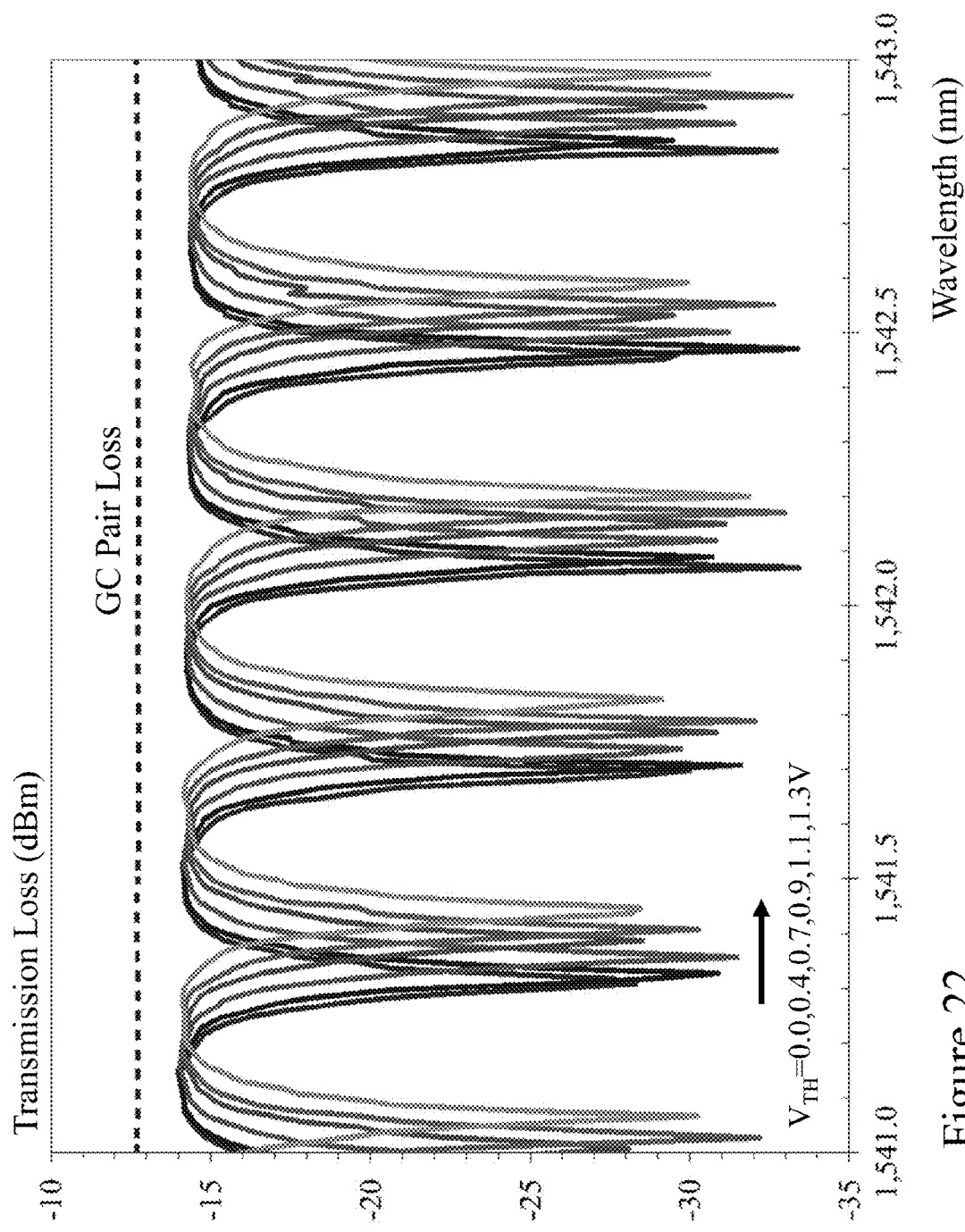
FIG. 22 depicts experimental transmission spectra for a ring resonator PAM-4 modulator according to an embodiment of the invention as depicted in FIG. 20 with thermal tuning.

Now referring to FIG. 21 there are depicted experimental transmission spectra for a RR-MZI PAM-4 modulator according to an embodiment of the invention as depicted in FIG. 20 wherein reverse bias was applied to the top active arm only, i.e. via third and/or fourth electrodes 2055 and 2065 respectively. As evident the RR-MZI exhibits approximately 20 dB extinction ratio for a voltage change of 0.6V. The fifth electrode 2070 via thermal tuning induced the required r phase shift by applying 1.6V to the n-doped thermal heater. Now referring to FIG. 22 there are depicted experimental transmission spectra for a ring resonator PAM-4 modulator according to an embodiment of the invention as depicted in FIG. 20 with thermal tuning wherein the resulting wavelength shift of the RR-MZI is 0.09 nm/V. Accordingly, for C-band operation with DWDM channel spacing of 100 GHz, 0.17 nm, can be aligned with less than 2V bias to the heater.

It would be evident to one skilled in the art that whilst the embodiments of the invention have been presented based upon SOI waveguides exploiting thermal and diode based control/tuning of the RR-MZI that alternate embodiments may be implemented with the same waveguide material system and other material systems. For example, other material systems including, but not limited to, InP, InGaAsP, GaAs, AlGaAs, GaInN, AlInGaP, GaInNAs may be employed.

It would be evident that the optical waveguides may be formed through a range of techniques including, but not limited to, material composition, ridges, doping, ion-implantation, and ion-exchange.

It would be apparent that optical waveguides exploiting X-on-insulator may include, but not be limited to, silicon, germanium, silicon nitride—silicon, intrinsic BOX layers, fabricated BOX layers, and silicon-oxide clad silicon.

It would be apparent that SOI RR-MZI modulators as described above in respect of embodiments of the invention may be integrated with monitoring photodiodes for feedback and control either through direct integration or through hybrid integration.

It would be apparent that SOI RR-MZI modulators as described above in respect of embodiments of the invention may be integrated with semiconductor lasers through hybrid integration including, but not limited to, discrete DFB lasers, discrete DBR lasers, arrayed DFB lasers, and arrayed DBR lasers. Optionally discrete or arrayed semiconductor optical amplifiers (SOA) may be employed in conjunction with one or more distributed Bragg gratings formed within the SOI waveguides per SOA.

It would be apparent that SOI RR-MZI modulators as described above in respect of embodiments of the invention may be integrated with control and drive circuits such as through the formation of SOI RR-MZI modulators on substrates with integral CMOS electronics or through hybrid integration of CMOS electronics with driver amplifiers hybridly integrated and manufactured within InP, GaAs, or SiGe for example.

It would be apparent that SOI RR-MZI modulators as described above in respect of embodiments of the invention may exploit Bragg gratings within the ring resonators to reduce sensitivity of the ring resonators to fabrication tolerances and environmental perturbations. Optionally, the ring resonator may be replaced and/or augmented by an annular Bragg resonator structure. Optionally, the ring resonator may comprise dual ring or multi-ring configurations. It would be further apparent that p-i-n diodes may be integrated within the ring waveguide for monitoring and/or control purposes.

It would be apparent that the directional coupler elements within the Mach-Zehnder interferometer/ring waveguide elements of the RR-MZI modulators described above may be replaced by other 2×2 3 dB splitter elements including, but not limited to, multimode interferometers (MMIs), X-junctions, asymmetric X-junctions, zero gap directional couplers, and multiple waveguide couplers. Further, it would be evident that such coupler elements may include additional electrical control signals to tune the split ration of the coupler element.

It would be evident that RR-MZI M-ary PAM modulators according to embodiments of the invention may employ drive electrodes that are weighted in length as determined by the phase shift to be induced by them such that the drive signals to the drive electrodes are nominally the same. Alternatively RR-MZI M-ary PAM modulators according to embodiments of the invention may employ drive electrodes that are identical in length such that the drive signals to the drive electrodes are determined based upon the phase shift to be induced by them. Other weightings between drive electrode length, drive electrode overlap to the optical mode, drive voltage etc. may be implemented without departing from the scope of the invention. Further, embodiments of the invention may be operated solely in reverse bias, solely in forward bias, or through a combination of positive and negative bias. Further different electrodes may be employed for forward and reverse bias according to the design of the RR-MZI M-ary PAM modulator.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A device comprising:
  a substrate;
  an optical circuit formed upon the substrate comprising:
    an input waveguide coupled to an input port of a first coupler comprising two inputs and two outputs;
    an output waveguide coupled to an output port of a second coupler comprising two inputs and two outputs;
    a Mach-Zehnder interferometer comprising the first coupler, a second coupler and first and second interferometer arms coupling the outputs from the first coupler to the inputs of the second coupler; and
    a ring waveguide coupling the other output of the second coupler to the other input of the first coupler and therein coupled to one of the first and second interferometer arms; and
  an electrical circuit formed upon the substrate comprising:
    in a first configuration a bias electrode disposed in predetermined relationship to the other of the first and second interferometer arms not coupled to the ring waveguide and at least two pairs of drive electrodes of a plurality of drive electrodes, each pair of drive electrodes of the plurality of electrodes being disposed to induce phase shifts in the first and second interferometer arms;

in a second configuration a bias electrode disposed in predetermined relationship to the other of the first and second interferometer arms not coupled to the ring waveguide and at least two drive electrodes of a plurality of drive electrodes, each drive electrode of the plurality of electrodes to induce a phase shift in the ring waveguide;

in a third configuration a bias electrode disposed in predetermined relationship to the other of the first and second interferometer arms not coupled to the ring waveguide and at least two drive electrodes of a plurality of drive electrodes, each drive electrode of the plurality of electrodes to induce a phase shift in the one of the first and second interferometer arms; and in a fourth configuration a first bias electrode disposed in predetermined relationship to the other of the first and second interferometer arms not coupled to the ring waveguide, a second bias electrode disposed within the ring waveguide in the portion external to the Mach-Zehnder interferometer, and at least two pairs of drive electrodes of a plurality of pairs of drive electrodes, each pair of drive electrodes comprising a first electrode in the first interferometer arm and a second electrode in the second interferometer arm such that the pair of electrodes induce opposite phase shifts within the first and second interferometer arms.

2. The device according to claim 1, wherein the device is a N-ary modulator and the number of drive electrodes comprising the plurality of drive electrodes is X where $2^X=N$.

3. The device according to claim 1, wherein the device is a N-ary modulator and the plurality of drive electrodes or pairs of drive electrodes equal N and the electrode lengths are defined by the geometric sequence $L=L_0 \cdot 2^X$ where $0 \leq X \leq N-1$ and $L_0$ is the length of the shortest drive electrode or pair of drive electrodes.

4. The device according to claim 1, wherein in the fourth configuration the first bias electrode is set such that the phase shift between the first and second interferometer arms is $\pi$.

5. A method of generating an N-ary pulse amplitude modulated optical signal comprising:

providing a N-ary modulator coupled to an optical source, the N-ary modulator exploiting a ring resonator Mach-Zehnder interferometer and comprising an optical layer and an electrical layer, wherein the optical layer comprises:

a Mach-Zehnder interferometer comprising a first coupler, a second coupler and first and second interferometer arms coupling the outputs from the first coupler to the inputs of the second coupler; and a ring waveguide coupling the other output of the second coupler to the other input of the first coupler and therein coupled to one of the first and second interferometer arms; and providing X electrical drive signals to the electrical layer of the N-ary modulator where $N=2^X$ and the electrical layer comprises:

in a first configuration a bias electrode disposed in predetermined relationship to the other of the first and second interferometer arms not coupled to the ring waveguide and at least two pairs of drive electrodes of a plurality of drive electrodes, each pair of drive electrodes of the plurality of electrodes being disposed to induce phase shifts in the first and second interferometer arms;

in a second configuration a bias electrode disposed in predetermined relationship to the other of the first and second interferometer arms not coupled to the ring waveguide and at least two drive electrodes of a plurality of drive electrodes, each drive electrode of the plurality of electrodes to induce a phase shift in the ring waveguide;

in a third configuration a bias electrode disposed in predetermined relationship to the other of the first and second interferometer arms not coupled to the ring waveguide and at least two drive electrodes of a plurality of drive electrodes, each drive electrode of the plurality of electrodes to induce a phase shift in the one of the first and second interferometer arms; and in a fourth configuration a first bias electrode disposed in predetermined relationship to the other of the first and second interferometer arms not coupled to the ring waveguide, a second bias electrode disposed within the ring waveguide in the portion external to the Mach-Zehnder interferometer, and at least two pairs of drive electrodes of a plurality of pairs of drive electrodes, each pair of drive electrodes comprising a first electrode in the first interferometer arm and a second electrode in the second interferometer arm such that the pair of electrodes induce opposite phase shifts within the first and second interferometer arms.

6. The method device according to claim 5, wherein the X drive electrodes or X pairs of drive electrodes are defined by the geometric sequence $L=L_0 \cdot 2^X$ where $0 \leq X \leq N-1$ and $L_0$ is the length of the shortest drive electrode or pair of drive electrodes.

7. The device according to claim 5, wherein in the fourth configuration the first bias electrode is set such that the phase shift between the first and second interferometer arms is $\pi$.

\* \* \* \* \*